(12) United States Patent
Chen et al.

(10) Patent No.: US 7,821,895 B2
(45) Date of Patent: Oct. 26, 2010

(54) DATA MANAGING METHOD FOR AN OPTICAL DISC DRIVE WRITING USER DATA INTO AN OPTICAL DISC HAVING DEFECTS

(75) Inventors: Ping-Sheng Chen, Chia-Yi Hsien (TW);
Shih-Hsin Chen, Tao-Yuan Hsien (TW);
Ching-Wen Hsueh, I-Lan Hsien (TW);
Ying-Che Hung, Taipei Hsien (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 92 days.

(21) Appl. No.: 12/416,928

(22) Filed: Apr. 2, 2009

(65) Prior Publication Data
US 2009/0190448 A1    Jul. 30, 2009

Related U.S. Application Data

(63) Continuation of application No. 11/380,213, filed on Apr. 26, 2006, now Pat. No. 7,539,105.

(30) Foreign Application Priority Data

May 5, 2005    (TW) ............................... 94114546 A

(51) Int. Cl.
*G11B 7/00* (2006.01)
(52) U.S. Cl. ................ 369/53.2; 369/53.17; 369/53.15; 369/47.14

(58) Field of Classification Search ....................... None
See application file for complete search history.

(56) References Cited

U.S. PATENT DOCUMENTS

| 6,662,309 | B2 * | 12/2003 | Ando et al. | .................... 714/8 |
| 7,315,496 | B2 * | 1/2008 | Wu | .......................... 369/47.14 |
| 2004/0078640 | A1 * | 4/2004 | Wu et al. | ....................... 714/6 |

* cited by examiner

*Primary Examiner*—Muhammad N Edun
(74) *Attorney, Agent, or Firm*—Winston Hsu; Scott Margo; Min-Lee Teng

(57) ABSTRACT

A data managing method for an optical disc drive writing data into an optical disc having defects is provided. The optical disc has a user data area and a spare area. The optical disc drive includes a first buffering space and a second buffering space. The data managing method includes: when the first buffering space receives a data corresponding to a defect, not suspending the first buffering space from receiving the user data, and transferring the data, corresponding to the defect and in the first buffering space, to the second buffering space; and when data amount in the second buffering space reaches a predetermined value, suspending the optical disc drive from writing data in the first buffering space into the user data area, and driving the optical disc drive to write data in the second buffering space into the spare area.

8 Claims, 24 Drawing Sheets

DATA MANAGING METHOD FOR AN OPTICAL DISC DRIVE WRITING USER DATA INTO AN OPTICAL DISC HAVING DEFECTS

CROSS REFERENCE TO RELATED APPLICATIONS

This continuation application claims the benefit of co-pending U.S. patent application Ser. No. 11/380,213, filed on Apr. 26, 2006 and incorporated herein by reference.

BACKGROUND

The invention relates to a method for writing user data into an optical disc data, and more particularly, to a data managing method for an optical disc drive writing user data into an optical disc having defects.

Recently, due to the low cost, tiny weight and volume, yet high capacity, the optical disc has become one of the most popular data-storing media in the information technology industry. Moreover, the invention of the recordable optical disc allows users to write their personal data into the optical disc. As a result, optical discs have grown to become one of the most important personal portable storing devices. Hence, increasing the stability and efficiency of recordable optical disc data accessing is a key point in the information technology industry.

Typically, the data on the optical disc is stored or read through the optical disc drive. Please refer to FIG. 1. FIG. 1 is a block diagram of a conventional optical disc drive 10. The optical disc drive 10 is utilized for accessing (i.e., storing data into and reading data from) an optical disc 22. As shown in FIG. 1, the optical disc drive 10 includes a carrier 14, a motor 12 for driving the carrier 14 to rotate, a pick-up head 16 for storing and reading data on the optical disc 22, a control circuit 18 for controlling the operation of the motor 12 and the pick-up head 16, and a memory 20 (e.g., a volatile random access memory) for buffering data during the operation of the control circuit 18. As one of ordinary skill in the art would understand, the memory 20 includes a main buffer 21a and a second buffer 21b. The main buffer 21a is utilized for storing the predetermined data to be written into a user data area on the optical disc 22. The second buffer 21b is utilized for storing the predetermined data to be written into a spare area on the optical disc 22. The optical disc 22 includes tracks 24 for recording data. Accordingly, when the optical disc 22 is placed on the carrier 14, the motor 12 can drive the carrier 14 and drive the optical disc 22 to rotate. That is, as the optical disc 22 is rotating, the tracks 24 of the optical disc 22 pass through the pick-up head 16. As the tracks 24 pass through the pick-up head 16 the control circuit 18 can store data onto or read data from the tracks 24 utilizing the pick-up head 16. The control circuit 18 stores and reads data onto and from the optical disc 22 according to a host 26. The host 26 can be a computer system, such as a personal computer, or a backend of a DVD recorder.

For a recordable optical disc, a certain location on the optical disc could be perceived as a "defect" because of any number of factors affecting the optical disc, such as: damage to the surface of the optical disc, a change in the material characteristic of the optical disc, or a disturbance in the minute particles. The specific location corresponding to a defect cannot be utilized for storing data correctly. Improvements to the recording function of the recordable optical disc will result in increased stability of the optical disc. A defect managing mechanism is proposed in the conventional optical disc specification. One of the most popular defect managing mechanisms provides a spare data area on the optical disc. As is well known, a defective part on the optical disc cannot be utilized for recording data correctly. As a result, when a defective part is identified the data that is originally recorded in the defect part will be further recoded into the spare area of the optical disc. The recording function of the optical disc, therefore, will not be influenced by the defective part. Please refer to FIG. 2. FIG. 2 is a schematic diagram illustrating the allocation of a lead-in area 27a, a user data area 27b, and a spare area 27c on the optical disc 22 shown in FIG. 1. The optical disc 22 (e.g., a conventional digital versatile disc), the user data area 27b includes a plurality of physical blocks 28a, 28b, 28c, and 28d; these are utilized for storing user data. The spare area 27c includes a plurality of physical blocks 28e, 28f, and 28g; these are utilized for storing spare data. Please note, for brevity only seven physical blocks are shown in FIG. 2. The lead-in area 27a includes a Defect Management Area (DMA) 29 for storing a Defect List Table 25, wherein the Defect List Table 25 includes a plurality of entries 23a and 23b. Each entry 23a or 23b is used for storing a defect physical block number (Defect PBN) that corresponds to the defect portion in the user data area 27b. Additionally, each entry also stores a replacement physical block number (Replacement PBN) that corresponds to the data in the spare area 27c. For example, if the physical blocks 28b and 28c have defects, the entry 23a will record the defect physical block number DPBN (28b) that corresponds to the physical block 28b and the replacement physical block number RPBN (28e) that corresponds to the physical block 28e. Additionally, the other entry 23b will record the defect physical block number DPBN (28c) that corresponds to the physical block 28c and the replacement physical block number RPBN (28f) that corresponds to the physical block 28f. Please note that, for brevity, FIG. 2 shows only the lead-in area 27a, the user data area 27b, and the spare area 27c and does not show the lead-out area.

During the process of recording data onto the optical disc 22, if the pick-up head 16 encounters a defect physical block number that is recorded in the Defect List Table 25, on the optical disc 22, the optical disc drive 10 must transfer the data in the defect physical block into a corresponding replacement physical block. That is, according to the information recorded in the Defect List Table 25, the data written in the physical block 28b will further be written into the physical block 28e, and the data written in the physical block 28c will further be written into the physical block 28f. Please note, the situation where data is over-written before being recorded on the optical disc during the data recording process must be avoided. Otherwise, the recorded data will be certain to contain errors.

Please refer to FIG. 1, FIG. 2, FIG. 3, and FIG. 4 simultaneously. FIG. 3 is a schematic diagram illustrating a first conventional data managing method applied in the memory 20 shown in FIG. 1. FIG. 4 is a flowchart illustrating management of the data corresponding to defects according to the first conventional data managing method. As shown in FIG. 1, the memory 20 includes a main buffer 21a and a second buffer 21b. The operation of the first conventional data managing method is detailed as follows:

Step 400: Are all of the user data written? If yes, proceed to step 460; otherwise, proceed to step 410.

Step 410: After the main buffer 21a receives the user data through the host 26, wherein the data length of the user data is not exceeding the buffer length of the main buffer 21a, suspend the main buffer 21a from receiving the user data, and after writing the data stored in the main buffer 21a into the user data area 27b of the optical disc 22, suspend from writing the data stored in the main buffer 21a into the optical disc 22.

Step 420: Does the main buffer 21a have the data corresponding to a defect? If yes, proceed to step 430; otherwise, return to step 400.

Step 430: Transfer the data corresponding to the defect, stored in the main buffer 21a, to the second buffer 21b.

Step 440: Check if the amount of data stored in the second buffer 21b reaches a predetermined value. If yes, proceed to step 450; otherwise, return to step 400.

Step 450: Drive the optical disc drive 10 to perform a seek to the spare area 27c, write the data stored in the second buffer 21b into the spare area 27c, perform a seek from the spare area 27c back to the user data area 27b, and then return to step 400.

Step 460: End data writing.

As shown in FIG. 3, at time $T_{11}$ the main buffer 21a stores a partial data $DATA_{11}$ corresponding to a user data according to its buffer length. The main buffer 21a is then suspended from storing following data corresponding to the user data. Next, the optical disc drive 10 reads the buffered partial data $DATA_{11}$ and writes the partial data $DATA_{11}$ into the user data area 27b on the optical disc 22. The writing process is suspended after writing the partial data $DATA_{11}$ (step 410) is finished. Meanwhile, there is no data corresponding to a defect in the main buffer 21a (step 420), therefore, in time $T_{12}$ the main buffer 21a continues to store the next partial data $DATA_{12}$, which includes data ($data_{11}$) corresponding to a defect, according to the buffer length. Similarly, the optical disc drive 10 firstly suspends the main buffer 21a from receiving the following partial data corresponding to the user data, reads the partial data $DATA_{12}$ and further writes the partial data $DATA_{12}$ into the user data area 27b of the optical disc 22, and then suspends the writing process after writing the partial data $DATA_{12}$ (step 410) is finished. Because the main buffer 21a has the data ($data_{11}$) corresponding to a defect (step 420), at time $T_{13}$ the optical disc drive 10 transfers the data ($data_{11}$), corresponding to a defect and stored in the main buffer 21a, into the second buffer 21b (step 430). Since the amount of data stored in the second buffer 21b does not reach a predetermined value, for example, the second buffer 21b is not full (step 440), at time $T_{14}$ the main buffer 21a continues to store the next partial data $DATA_{12}$, which includes the data ($data_{12}$) corresponding to a defect according to the buffer length. Similarly, the optical disc drive 10 firstly suspend the main buffer 21a from receiving the following partial data corresponding to the user data, reads the partial data $DATA_{13}$ and further writes the partial data $DATA_{13}$ into the user data area 27b of the optical disc 22, and then suspends the writing process after writing the partial data $DATA_{13}$ (step 410) is finished. Meanwhile, because the main buffer 21a has the data ($data_{12}$) corresponding to a defect (step 420), at time $T_{15}$ the optical disc drive 10 transfers the data ($data_{12}$) corresponding to a defect, and stored in the main buffer 21a, into the second buffer 21b (step 430). Since the amount of data stored in the second buffer 21b does not reach a predetermined value, for example, the second buffer 21b is not full (step 440), the main buffer 21a continues to store the following partial data corresponding to the user data according to the buffer length. At time $T_1'$, the main buffer 21a stores a partial data $DATA_1'$, and the amount of data stored in the second buffer 21b reaches a predetermined value (e.g., the second buffer 21b is full). Therefore, the optical disc drive 10 performs a seek to the spare area 27c, and writes the data ($data_{11}$-$data_1'$) stored in the second buffer 21b into the spare area 27c. The above-mentioned steps are repeated until all of the user data are written on the optical disc 22 (steps 400 and 460).

Please refer to FIG. 1, FIG. 2, FIG. 5, and FIG. 6 simultaneously. FIG. 5 is a schematic diagram illustrating a second conventional data managing method applied to the memory 20 shown in FIG. 1. FIG. 6 is a flowchart illustrating management of the data corresponding to defects according to the second conventional data managing method. The operation of the second conventional data managing method is detailed as follows:

Step 600: Are all of the user data written? If yes, proceed to step 650; otherwise, proceed to step 610.

Step 610: A micro-controller (not shown) in the control circuit 18 first calculates a predetermined length between the address of the current data and the starting address of data corresponding to a next defect of the optical disc 22.

Step 615: The main buffer 21a receives the user data corresponding to the predetermined length through the host 26. After the data stored in the main buffer 21a with the predetermined length is written into the user data area 27b of the optical disc 22, suspend from writing the data stored in the main buffer 21a into the optical disc.

Step 616: After the main buffer 21a receives the user data of a data length not exceeding the buffer length of the main buffer 21a through the host 26, suspend the main buffer 21a from receiving the user data, and after the data stored in the main buffer 21a is written into the user data area 27b of the optical disc 22, suspend from writing the data stored in the main buffer 21a into the optical disc 22.

Step 620: Transfer the data corresponding to the defect, and stored in the main buffer 21a, to the second buffer 21b.

Step 630: Check if the amount of data stored in the second buffer 21b reaches a predetermined value. If yes, proceed to step 640; otherwise, return to step 600.

Step 640: Drive the optical disc drive 10 to perform a seek to the spare area 27c, write the data stored in the second buffer 21b into the spare area 27c, perform a seek from the spare area 27c back to the user data area 27b, and then return to step 600.

Step 650: End data writing.

The control circuit 18 first calculates a predetermined length between the address of the current partial data $DATA_{21}$ corresponding to the user data and the starting address of the data ($data_{21}$) corresponding to a next defect of the optical disc 22 (step 610). The main buffer 21a receives the user data of the predetermined length through the host 26, and the optical disc drive 10 writes the data stored in the main buffer 21a into the user data area 27b of the optical disc 22. As shown in FIG. 5, at time $T_{21}$ the main buffer 21a receives data bits of the partial data $DATA_{21}$. Additionally, the optical disc drive 10 reads the data bits of the partial data $DATA_{21}$ currently stored in the main buffer 21a for data recording where at this time the main buffer 21a has not yet received all of the data bits of the partial data $DATA_{21}$. However, at time $T_{22}$, the main buffer 21a has received all data bits of the partial data $DATA_{21}$. Therefore, the host 26 then suspends from transferring data into the main buffer 21a, while the optical disc drive 10 continues the writing process. At time $T_{23}$, the optical disc drive 10 finishes writing all of the data in the main buffer 21a into the user data area 27b of the optical disc 22 (i.e., the user data of the predetermined length has been completely written). Next, the optical disc drive 10 suspends the data writing process (step 615). At time $T_{24}$, the main buffer 21a receives the next partial data $DATA_{22}$ corresponding to the user data according to the buffer length. Please note that, the initial data of the partial data $DATA_{22}$ is the data ($data_{21}$) corresponding to a defect. The optical disc drive 10 firstly suspends the main buffer 21a from receiving any following data corresponding to the user data, reads the partial data $DATA_{22}$ and further writes the partial data $DATA_{22}$ into the user data area 27b of the optical disc 22, and then suspends the writing process after writing the partial data $DATA_{22}$ (step 616) is finished. Meanwhile, because the main buffer 21a has the data ($data_{21}$)

corresponding to a defect, at time $T_{25}$ the optical disc drive 10 transfers the data (data$_{21}$) corresponding to the defect, and stored in the main buffer 21a, into the second buffer 21b (step 620). Since the amount of data stored in the second buffer 21b does not reach a predetermined value, for example, the second buffer 21b is not full (step 630), then return to step 600. As shown in FIG. 5, at time $T_2'$, the main buffer 21a stores a partial data DATA$_2'$, and the amount of data stored in the second buffer 21b reaches a predetermined value (e.g., the second buffer 21b is full). Therefore, the optical disc drive 10 performs a seek to the spare area 27c, and writes the data (data$_{21}$-data$_2'$) stored in the second buffer 21b into the spare area 27c (step 640). The above-mentioned steps are repeated until all of the user data are written onto the optical disc 22 (steps 600 and 650).

Please refer to FIG. 1, FIG. 2, FIG. 7, and FIG. 8 simultaneously. FIG. 7 is a schematic diagram illustrating a third conventional data managing method applied to the memory 20 shown in FIG. 1. FIG. 8 is a flowchart illustrating management of the data corresponding to defects according to the third conventional data managing method. The operation of the third conventional data managing method is detailed as follows:

Step 800: Are all of the user data written? If yes, proceed to step 850; otherwise, proceed to step 810.

Step 810: A micro-controller (not shown) in the control circuit 18 first calculates a predetermined length between the address of the current data and the starting address of data corresponding to a next defect of the optical disc 22.

Step 815: The main buffer 21a receives the user data of the predetermined length plus the buffer length of the main buffer 21a through the host 26. After the data stored in the main buffer 21a with the predetermined length plus the buffer length of the main buffer 21a is written into the user data area 27b of the optical disc 22, suspend from writing the data stored in the main buffer 21a into the optical disc.

Step 830: Check if the amount of data stored in the second buffer 21b reaches a predetermined value. If yes, proceed to step 840; otherwise, return to step 800.

Step 840: Drive the optical disc drive 10 to perform a seek to the spare area 27c, write the data stored in the second buffer 21b into the spare area 27c, perform a seek from the spare area 27c back to the user data area 27b, and then return to step 800.

Step 850: End data writing.

The control circuit 18 first calculates a predetermined length between the address of the current partial data DATA$_{31}$ corresponding to the user data and the starting address of a data (data$_{31}$) corresponding to a next defect of the optical disc 22 (step 810). The main buffer 21a receives the user data of the predetermined length plus the buffer length of the main buffer 21a through the host 26, and the optical disc drive 10 writes the data stored in the main buffer 21a into the user data area 27b of the optical disc 22. As shown in FIG. 7, at time $T_{31}$ the main buffer 21a receives data bits of the partial data DATA$_{31}$ according to the buffer length. Additionally, the optical disc drive 10 reads the data bits of the partial data DATA$_{31}$ currently stored in the main buffer 21a for data recording. At this time, the main buffer 21a has not yet received all data bits of the partial data DATA$_{31}$ with the predetermined length plus the buffer length. At time $T_{32}$, the main buffer 21a finishes receiving all data bits with the predetermined length plus the buffer length (the initial data of the partial data DATA$_{32}$ is the data (data$_{31}$) corresponding to a defect). Therefore, the host 26 then suspends from transferring data into the main buffer 21a, and the optical disc drive 10 continues the writing process. At time $T_{33}$, the optical disc drive 10 finishes writing all of the data in the main buffer 21a into the user data area 27b of the optical disc 22. Next, the optical disc drive 10 suspends the writing process of the partial data DATA$_{32}$ (step 815). Meanwhile, because the main buffer 21a has the data (data$_{31}$) corresponding to a defect, at time $T_{34}$ the optical disc drive 10 transfers the data (data$_{31}$) corresponding to a defect, and stored in the main buffer 21a, into the second buffer 21b (step 820). The amount of data stored in the second buffer 21b does not reach a predetermined value, for example, the second buffer 21b is not full (step 830). As shown in FIG. 7, at time $T_3'$, the main buffer 21a stores a partial data DATA$_3'$, and the amount of data stored in the second buffer 21b reaches a predetermined value (e.g., the second buffer 21b is full). Therefore, the optical disc drive 10 performs a seek to the spare area 27c, and writes the data (data$_{31}$-data$_3'$) stored in the second buffer 21b into the spare area 27c (step 840). The above-mentioned steps are repeated until all of the user data are written on the optical disc 22 (steps 800 and 850).

Please refer to FIG. 1, FIG. 2, FIG. 9, and FIG. 10 simultaneously. FIG. 9 is a schematic diagram illustrating a fourth conventional data managing method applied to the memory 20 shown in FIG. 1. FIG. 10 is a flowchart illustrating management of the data corresponding to defects according to the fourth conventional data managing method. The operation of the fourth conventional data managing method is detailed as follows:

Step 1000: Are all of the user data written? If yes, proceed to step 1050; otherwise, proceed to step 1010.

Step 1010: The main buffer 21a first receives the user data through the host 26 and then the optical disc drive 10 directly writes the received user data into the optical disc 22.

Step 1015: After the main buffer 21a receives a data corresponding to a defect on the optical disc 22, the main buffer 21a suspends from receiving the user data, and the optical disc drive 10 suspends from writing the data stored in the main buffer 21a into the optical disc 22.

Step 1020: Transfer the data corresponding to a defect, and stored in the main buffer 21a, to the second buffer 21b.

Step 1030: Check if the amount of data stored in the second buffer 21b reaches a predetermined value. If yes, proceed to step 1040; otherwise, return to step 1000.

Step 1040: Drive the optical disc drive 10 to perform a seek to the spare area 27c, write the data stored in the second buffer 21b into the spare area 27c, perform a seek from the spare area 27c back to the user data area 27b, and then return to step 1000.

Step 1050: End data writing.

As shown in FIG. 9, at time $T_{41}$, the host 26 transfers the partial data DATA$_{41}$ corresponding to a user data into the main buffer 21a. The optical disc drive 10 then reads the partial data DATA$_{41}$ and further writes the partial data DATA$_{41}$ into the user data area 27b of the optical disc 22 (step 1010). Next, at time $T_{42}$, since the main buffer 21a receives the data (data$_{41}$) corresponding to a defect from the host 26, the main buffer 21a suspends from receiving the following partial data DATA$_{41}$ corresponding to the user data. Meanwhile, the optical disc drive 10 suspends from writing the data stored in the main buffer 21a into the optical disc 22 (step 1015). Next, at time $T_{43}$, the optical disc drive 10 transfers the data (data$_{41}$) corresponding to a defect in the main buffer 21a into the second buffer 21b (step 1020). Since the amount of data stored in the second buffer 21b does not reach a predetermined value, for example, the second buffer 21b is not full (step 1030), the host 26 allows the optical disc drive 10 to continue transferring the partial data DATA$_{41}$ corresponding to the user data into the main buffer 21a. Then the optical disc drive 10 continues reading the partial data DATA$_{41}$ and further writing the partial data DATA$_{41}$ into the user data area 27b of the optical disc 22. At time $T_4'$, since the amount of data stored in the second buffer 21b reaches a predetermined value (e.g., the second buffer 21b is full), the optical disc drive 10 performs a seek to the spare area 27c, and writes the data (data$_{41}$-data$_4'$) stored in the second buffer 21b into the spare area 27c. The above-mentioned steps are repeated until all of the user data are written onto the optical disc 22 (steps 1000 and 1050).

Please refer to FIG. 1, FIG. 2, FIG. 11, and FIG. 12 simultaneously. FIG. 11 is a schematic diagram illustrating a fifth conventional data managing method applied to the memory 20 shown in the FIG. 1. FIG. 12 is a flowchart illustrating management of the data corresponding to defects according to the fifth conventional data managing method. The operation of the fifth conventional data managing method is detailed as follows:

Step 1200: Are all of the user data written? If yes, proceed to step 1250; otherwise, proceed to step 1210.

Step 1210: The main buffer 21a first receives the user data through the host 26 and then the optical disc drive 10 directly writes the received user data into the optical disc 22.

Step 1215: After the main buffer 21a receives a data corresponding to a defect on the optical disc 22, the optical disc drive 10 drives the main buffer 21a to store an additional section of the user data following the data corresponding to a defect where data length of the additional section is equal to a buffer length of the main buffer 21a, and then suspends the main buffer 21a from receiving the user data. Moreover, after writing the data stored in the main buffer 21a is finished, suspend from writing the data stored in the main buffer 21a into the optical disc 22.

Step 1220: Transfer the data corresponding to a defect, and stored in the main buffer 21a, to the second buffer 21b.

Step 1230: Check if the amount of data stored in the second buffer 21b reaches a predetermined value. If yes, proceed to step 1240; otherwise, return to step 1200.

Step 1240: Drive the optical disc drive 10 to perform a seek to the spare area 27c, write the data stored in the second buffer 21b into the spare area 27c, perform a seek from the spare area 27c back to the user data area 27b, and then return to step 1200.

Step 1250: End data writing.

As shown in FIG. 11, at time $T_{51}$, the host 26 transfers the partial data DATA$_{51}$ corresponding to a user data into the main buffer 21a. The optical disc drive 10 then reads the partial data DATA$_{51}$ and further writes the partial data DATA$_{51}$ into the user data area 27b of the optical disc 22 (step 1210). At time $T_{52}$, since the main buffer 21a does not receive any data corresponding to a defect, the optical disc drive 10 does not suspend the writing process. Next, at time $T_{53}$, since the main buffer 21a receives the data (data$_{51}$) corresponding to a defect, the main buffer 21a then stores an additional section of the user data following the starting address of the data (data$_{51}$) where data length of the additional section is equal to a buffer length of the main buffer 21a. After the optical disc drive 10 finishes writing the data stored in the main buffer 21a into the optical disc 22, the optical disc drive 10 suspends from writing the data stored in the main buffer 21a into the optical disc 22 (step 1215). Next, at time $T_{54}$, the optical disc drive 10 transfers the data (data$_{51}$) corresponding to a defect, and stored in the main buffer 21a, into the second buffer 21b (step 1220). Since the amount of data stored in the second buffer 21b does not reach a predetermined value, for example, the second buffer 21b is not full (step 1230), the host 26 allows the optical disc drive 10 to continue transferring the partial data DATA$_{51}$ corresponding to the user data into the main buffer 21a. Then the optical disc drive 10 continues reading the partial data DATA$_{51}$ and further writing the partial data DATA$_{51}$ into the user data area 27b of the optical disc 22. At time $T_5'$, since the amount of data stored in the second buffer 21b reaches a predetermined value (e.g., the second buffer 21b is full), the optical disc drive 10 then performs a seek to the spare area 27c, and writes the data (data$_{51}$-data$_5'$) stored in the second buffer 21b into the spare area 27c. The above-mentioned steps are repeated until all of the user data are written onto the optical disc 22 (steps 1200 and 1250).

As mentioned earlier, in the first conventional data managing method it is necessary to suspend from receiving the user data and writing the data stored in the main buffer 21a into the optical disc 22 each time the user data of a buffer length of the main buffer 21a is received. Therefore, the number of times of data recording suspension is substantially equal to the result of dividing the user data by the buffer length. Among the related art methods described earlier, this method has the maximum suspension times and the poorest data management efficiency.

The second conventional data managing method is similar to the fourth conventional data managing method. Referring to the above-mentioned flows, the major difference between the second conventional data managing method and the fourth conventional data managing method being that the second data managing method makes use of a firmware means (i.e., a predetermined firmware is utilized to control the micro-controller inside the control circuit 18) to calculate the starting address of the data corresponding to a defect, and stored in the main buffer, and then suspend the data receiving and data writing. While in the fourth data managing method additional hardware (not shown) can be utilized to suspend the data receiving and data writing after storing a data in the main buffer 21a corresponding to a defect on the optical disc 22. It is realized from this description that the data managing efficiency of the fourth conventional data managing method using the hardware monitoring scheme is better than that of the second conventional data managing method.

The third conventional data managing method and the fifth conventional data managing method are improved methods based on the second conventional data managing method and the fourth conventional data managing method, respectively. In both the third conventional data managing method and the fifth conventional data managing method the optical disc drive 10 drives the main buffer 21a to store an additional section of the user data with a buffer length of the main buffer 21a while receiving the data correspond to a defect, and then suspends data receiving and data writing. Therefore, the number of times of data recording suspension in both methods is equal to the result of dividing all the user data by an increased buffer length having one more buffer length added, and thus the number of times that data recording suspension is necessary is reduced accordingly.

As mention above, the most efficient related art method is the above-mentioned fifth conventional data managing method, and next are the third method, the fourth method, the second method, and the first method in order of decreasing efficiency. However, when the defects happen more frequently, the data managing efficiency of the fifth conventional data managing method becomes the same as the first conventional data managing method due to the limitation of the buffer length. Moreover, while receiving a data corresponding to a defect, the main buffer 21a is capable of receiving only one more section of the user data of the buffer length. Then the main buffer 21a is forced to suspend from receiving the user data. Therefore, the main buffer 21a cannot avoid the need to suspend at least a certain number of times for receiving all of the user data. However, during each data recording suspension, the optical disc drive must dedicate time for the short seek to perform. More defects directly results in more suspension times. Furthermore, it follows that as the number of suspensions increases, the associated cost likewise increases. This result causes data recording inefficiency that cannot be improved.

SUMMARY

It is one of the objectives of the present invention to provide a data managing method for an optical disc drive writing user data into an optical disc having defects, to solve the above-mentioned problems.

According to one aspect of the present invention, a data managing method for an optical disc drive writing user data into an optical disc having defects is disclosed. The optical disc drive has a first buffering space and a second buffering space. The first buffering space is for storing data predetermined to be recorded into a user data area on the optical disc, and the second buffering space is for storing data predetermined to be recorded into a spare area on the optical disc. The data managing method includes following steps: (a) when the first buffering space receives a data corresponding to a defect of the optical disc, not suspending the first buffering space from receiving the user data, and transferring the data, corresponding to the defect and stored in the first buffering space, to the second buffering space; and (b) when the amount of data stored in the second buffering space reaches a predetermined value, suspending the optical disc drive from writing data stored in the first buffering space into the user data area, and driving the optical disc drive to write data stored in the second buffering space into the spare area.

According to another aspect of the present invention, a data managing method for an optical disc drive writing user data into an optical disc having defects is disclosed. The optical disc drive has a first buffering space and a second buffering space. The first buffering space is for storing data predetermined to be recorded into a user data area on the optical disc, and the second buffering space is for storing data predetermined to be recorded into a spare area on the optical disc. The data managing method includes following steps: when the first buffering space receives a data corresponding to a defect of the optical disc, not suspending from reading the data stored in the first buffering space and writing the data stored in the first buffering space into the optical disc, and transferring the data, corresponding to the defect and stored in the first buffering space, to the second buffering space; and when the amount of data stored in the second buffering space reaches a predetermined value, suspending the optical disc drive from writing data stored in the first buffering space into the user data area, and driving the optical disc drive to write data stored in the second buffering space into the spare area.

If an optical disc drive receives a data corresponding to a defect when recording user data onto an optical disc, the data managing method of the present invention keeps recording data for a short period of time and then controls the main buffer to stop receiving user data when detecting that the amount of data stored in a second buffer reaches a predetermined value. As a result, the short seek time is effectively saved and the recording efficiency is greatly improved.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
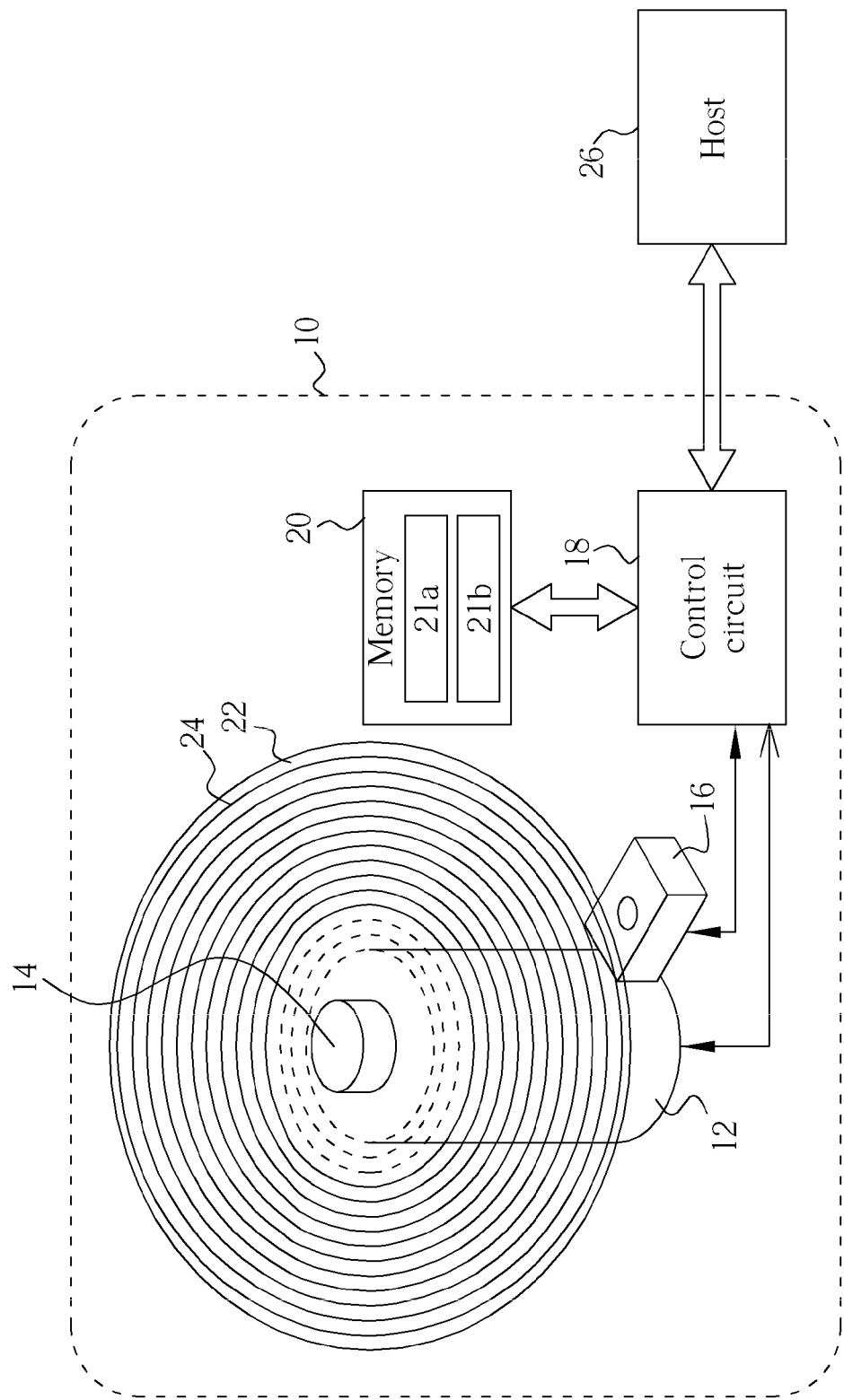
FIG. 1 is a block diagram of a conventional optical disc drive.
Figure 2:
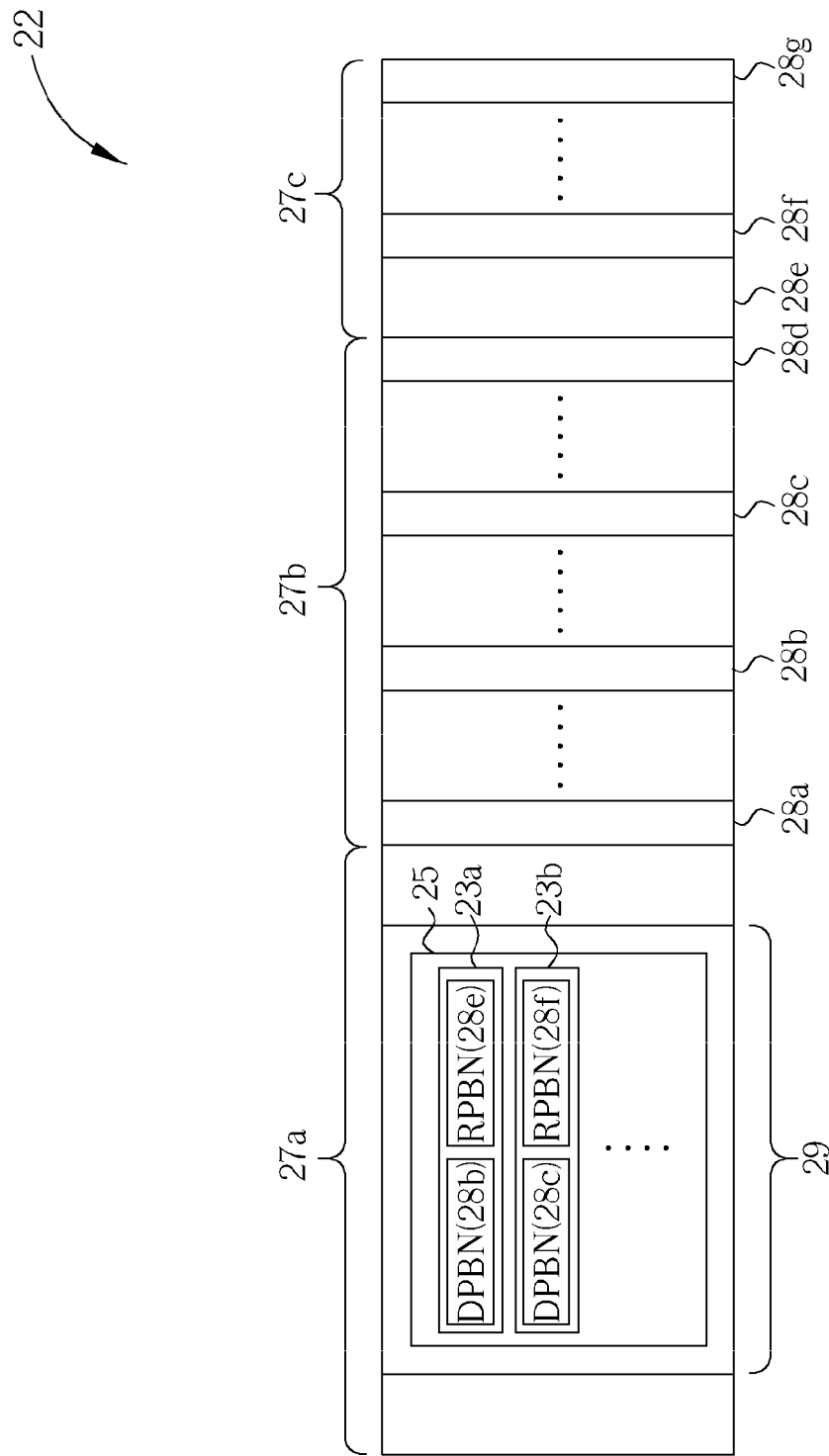
FIG. 2 is a schematic diagram illustrating the allocation of a lead-in area, a user data area, and a spare area on an optical disc shown in FIG. 1.
Figure 3:
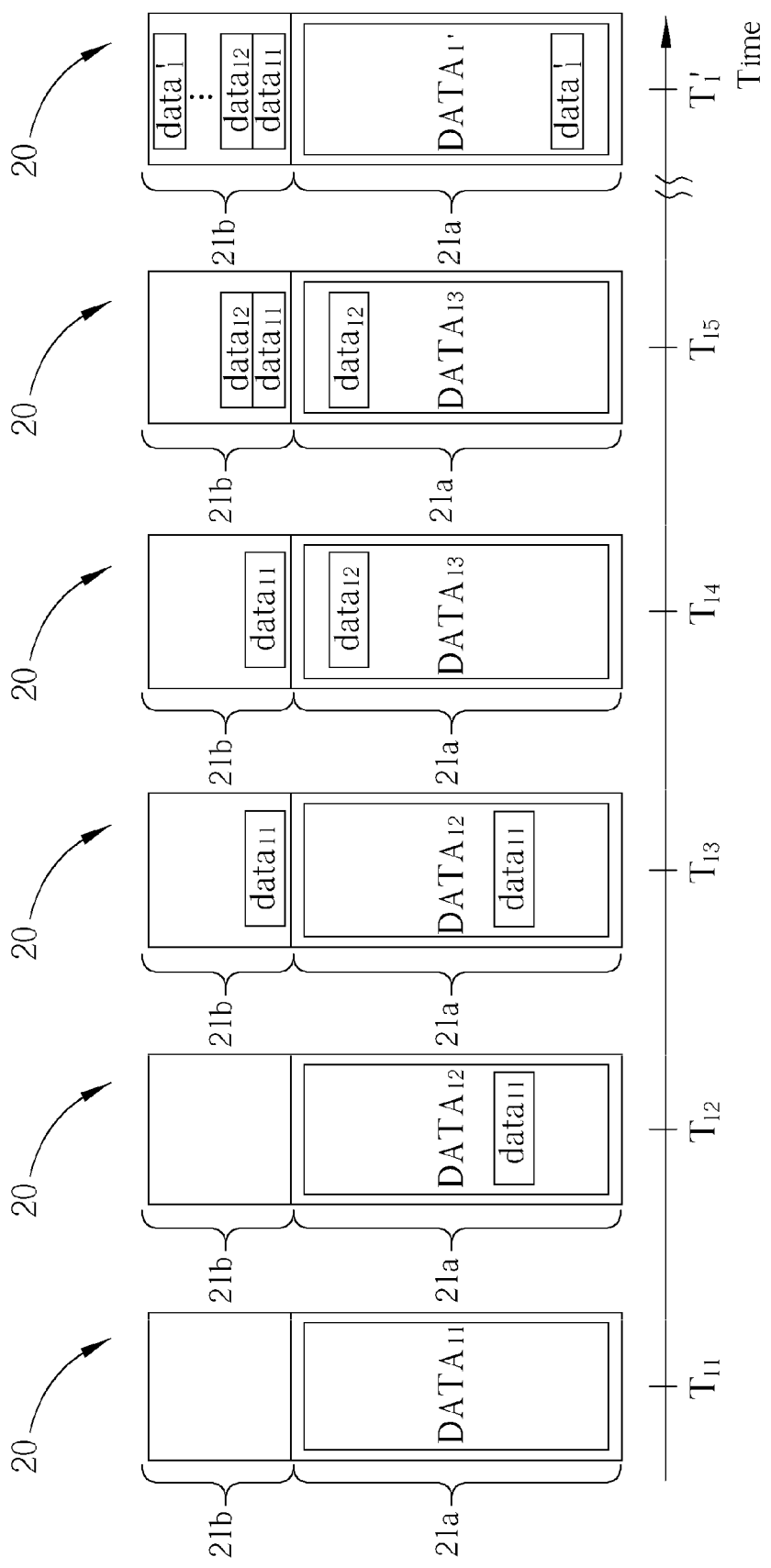
FIG. 3 is a schematic diagram illustrating a first conventional data managing method applied to a memory shown in FIG. 1.
Figure 4:
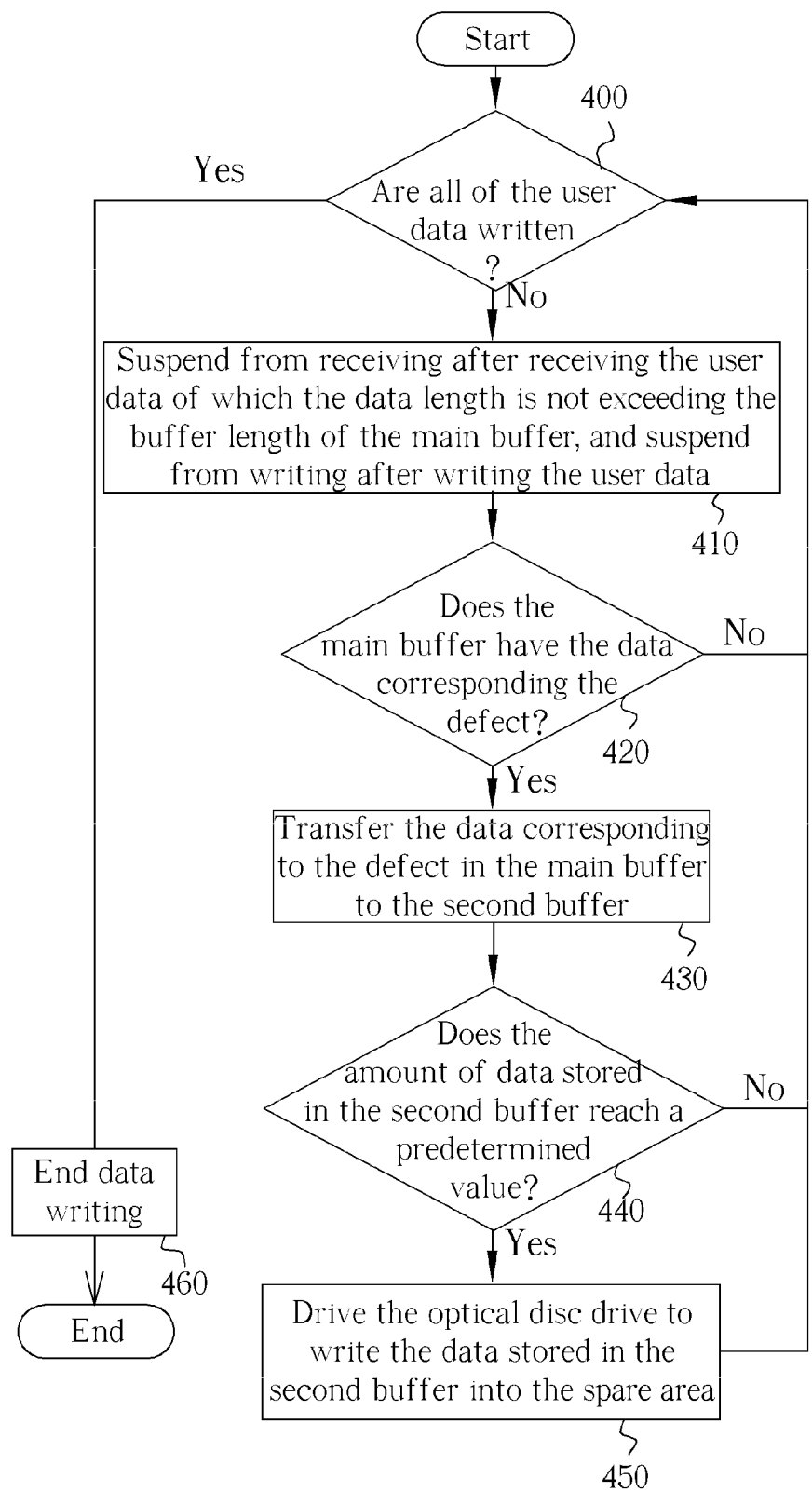
FIG. 4 is a flowchart illustrating management of the data corresponding to defects according to the first conventional data managing method.
Figure 5:
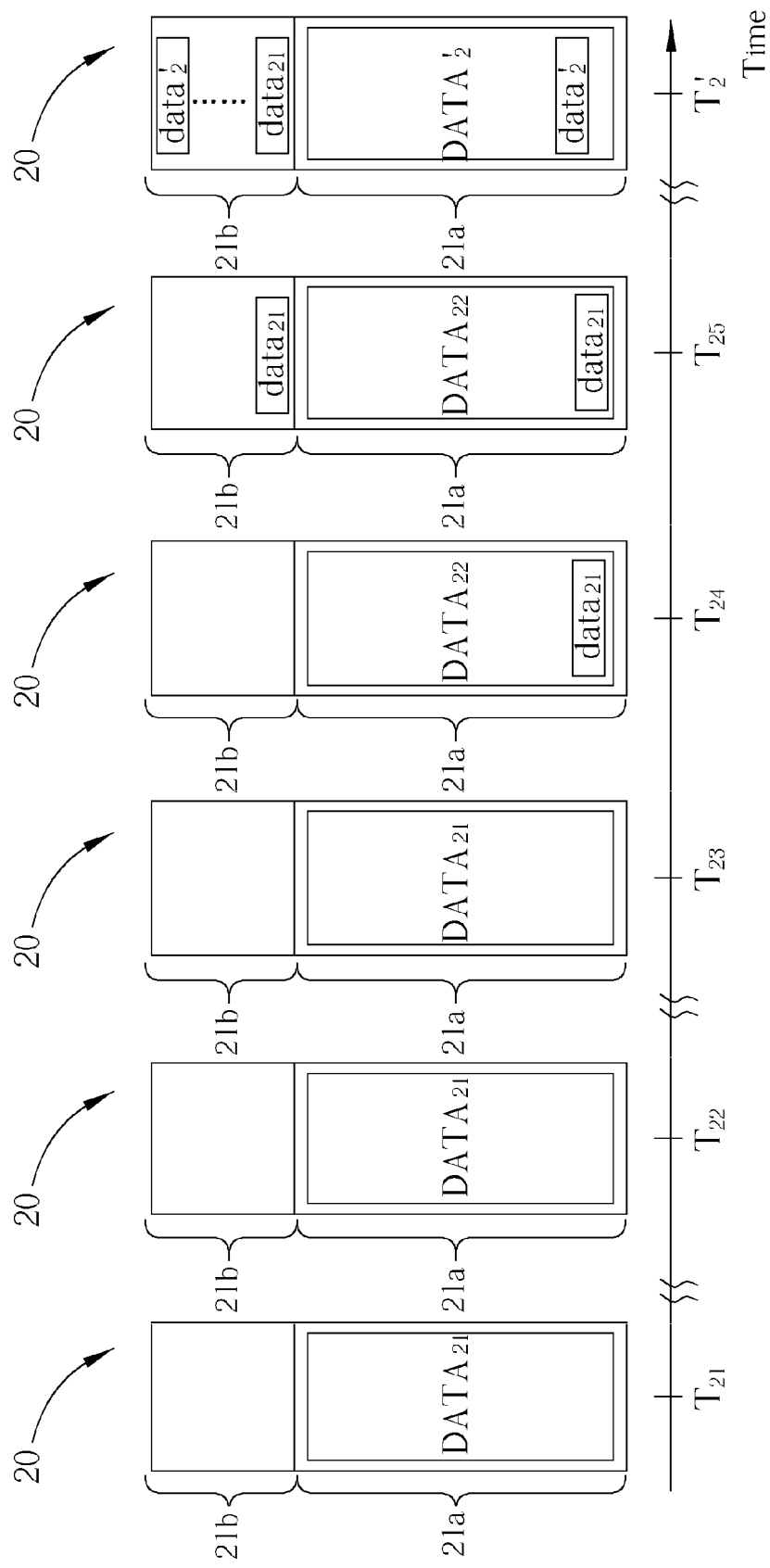
FIG. 5 is a schematic diagram illustrating a second conventional data managing method applied to the memory shown in FIG. 1.
Figure 6:
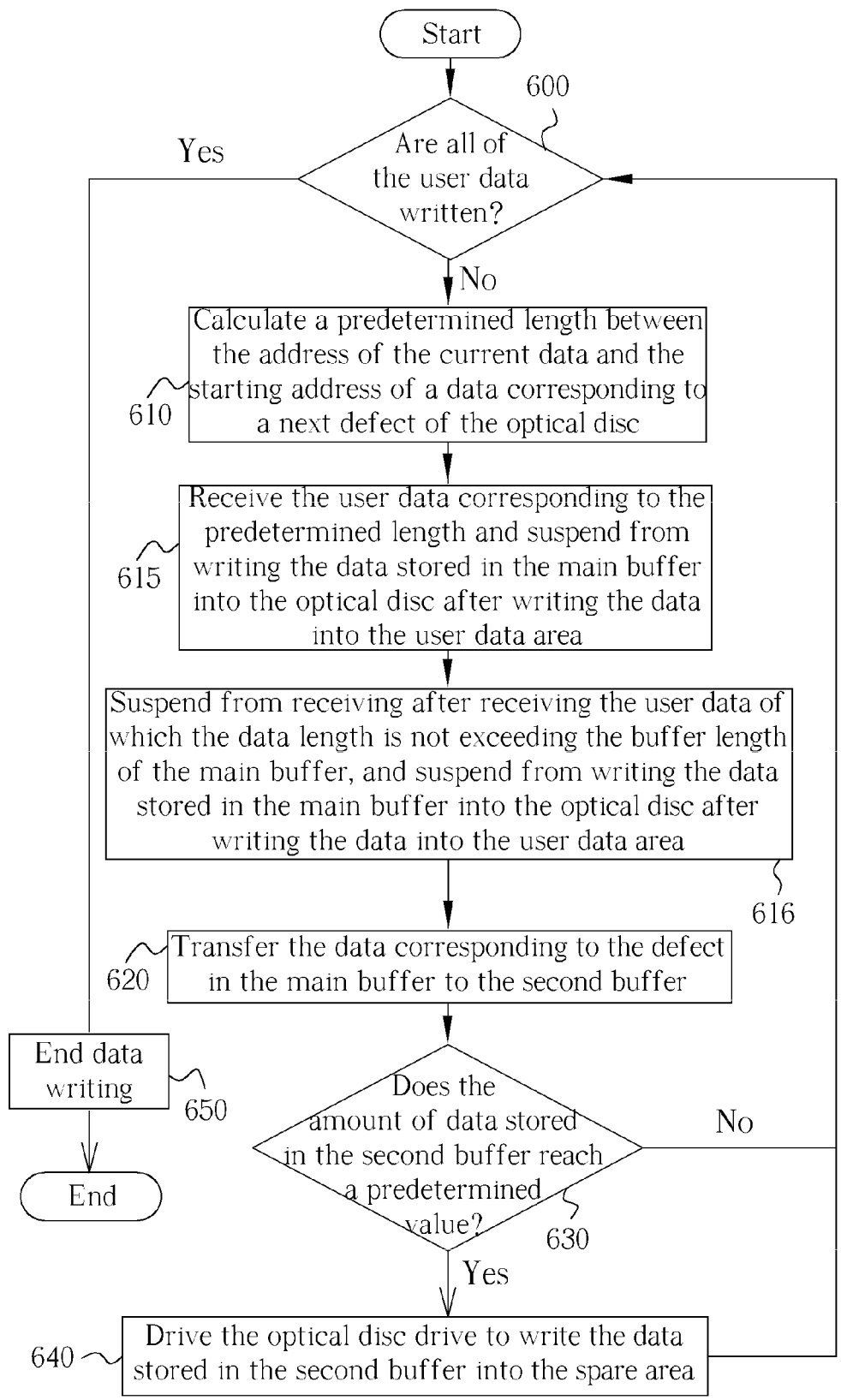
FIG. 6 is a flowchart illustrating management of the data corresponding to defects according to the second conventional data managing method.
Figure 7:
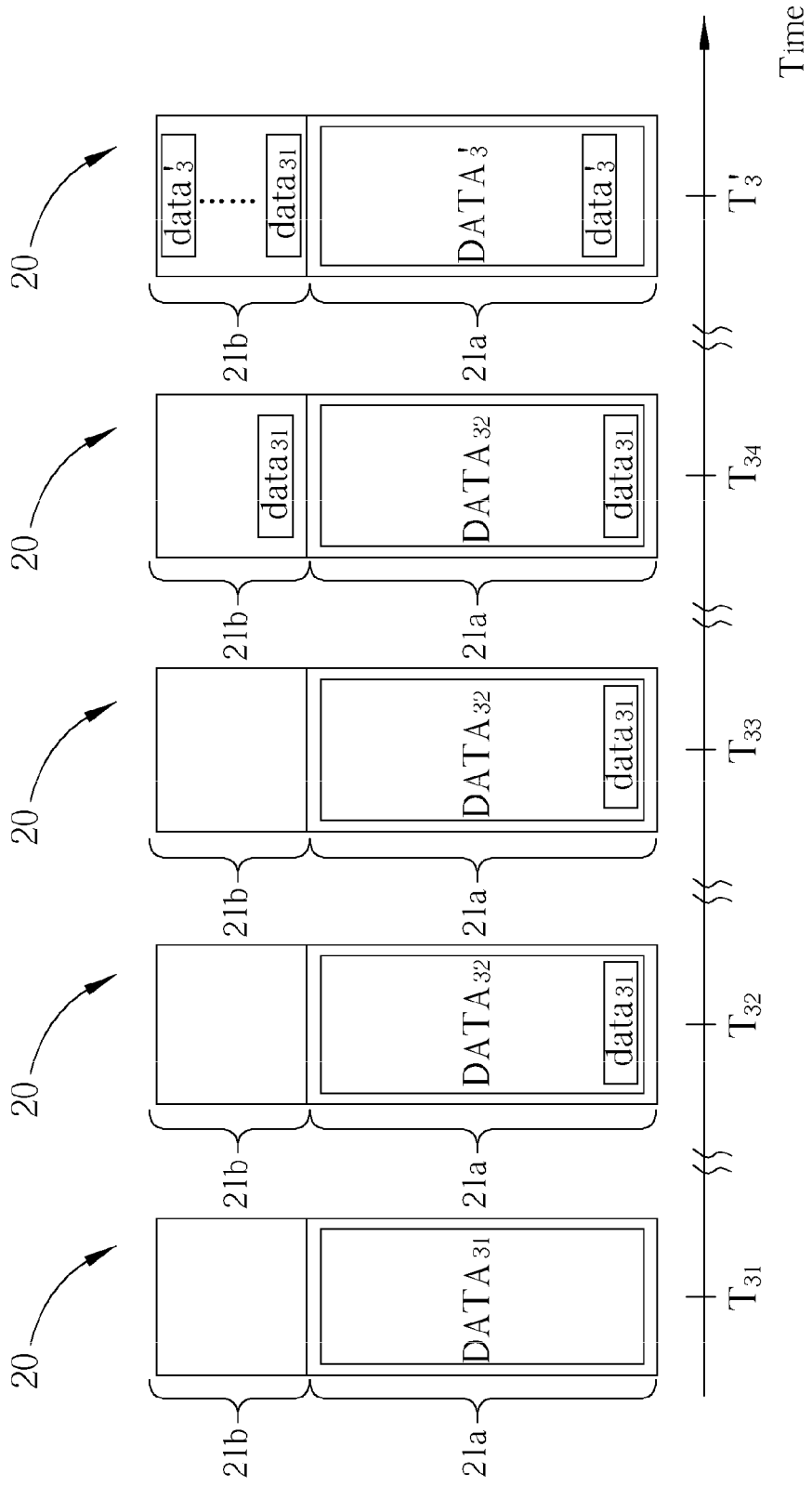
FIG. 7 is a schematic diagram illustrating a third conventional data managing method applied to the memory shown in FIG. 1.
Figure 8:
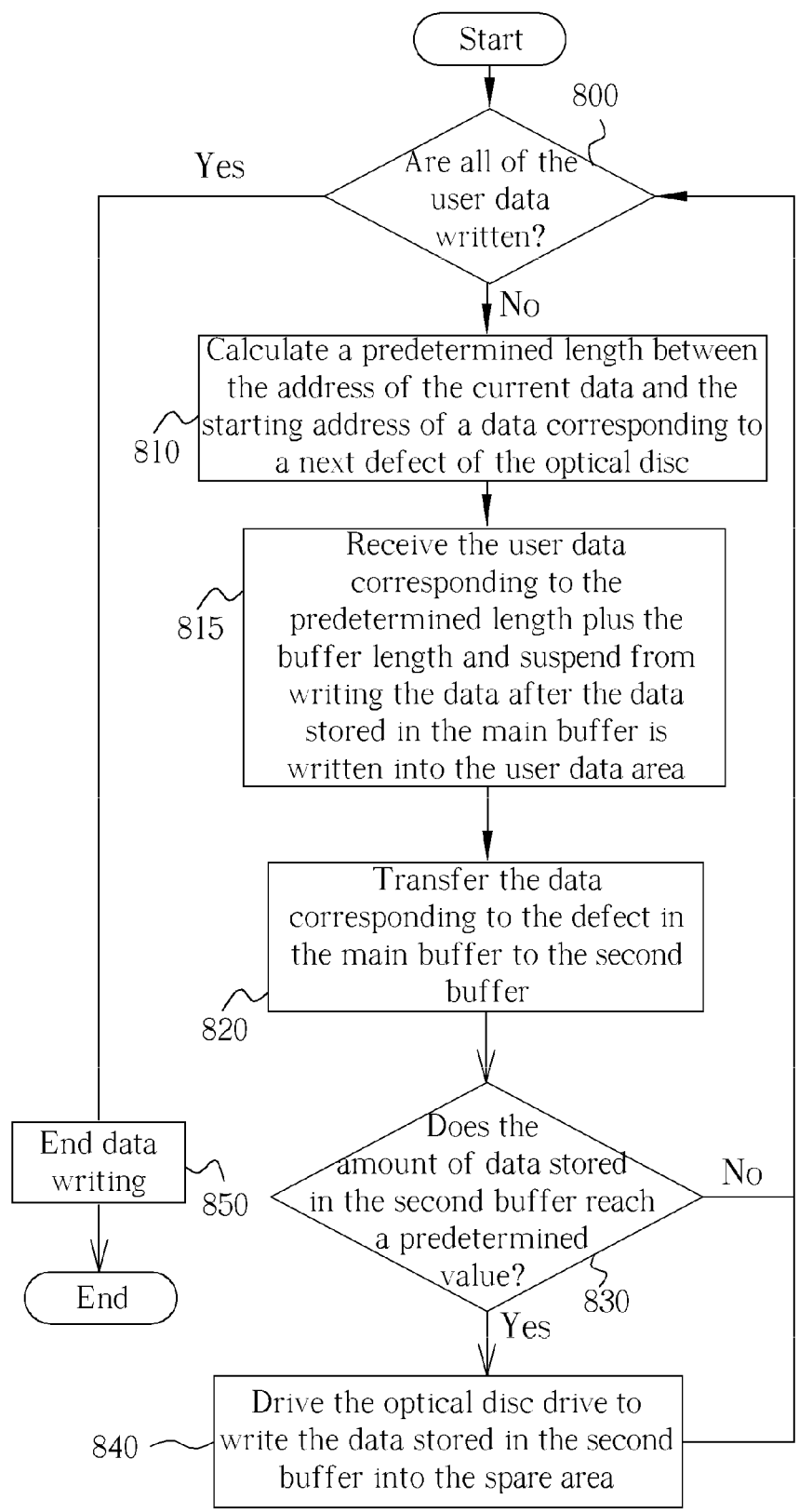
FIG. 8 is a flowchart illustrating management of the data corresponding to defects according to the third conventional data managing method.
Figure 9:
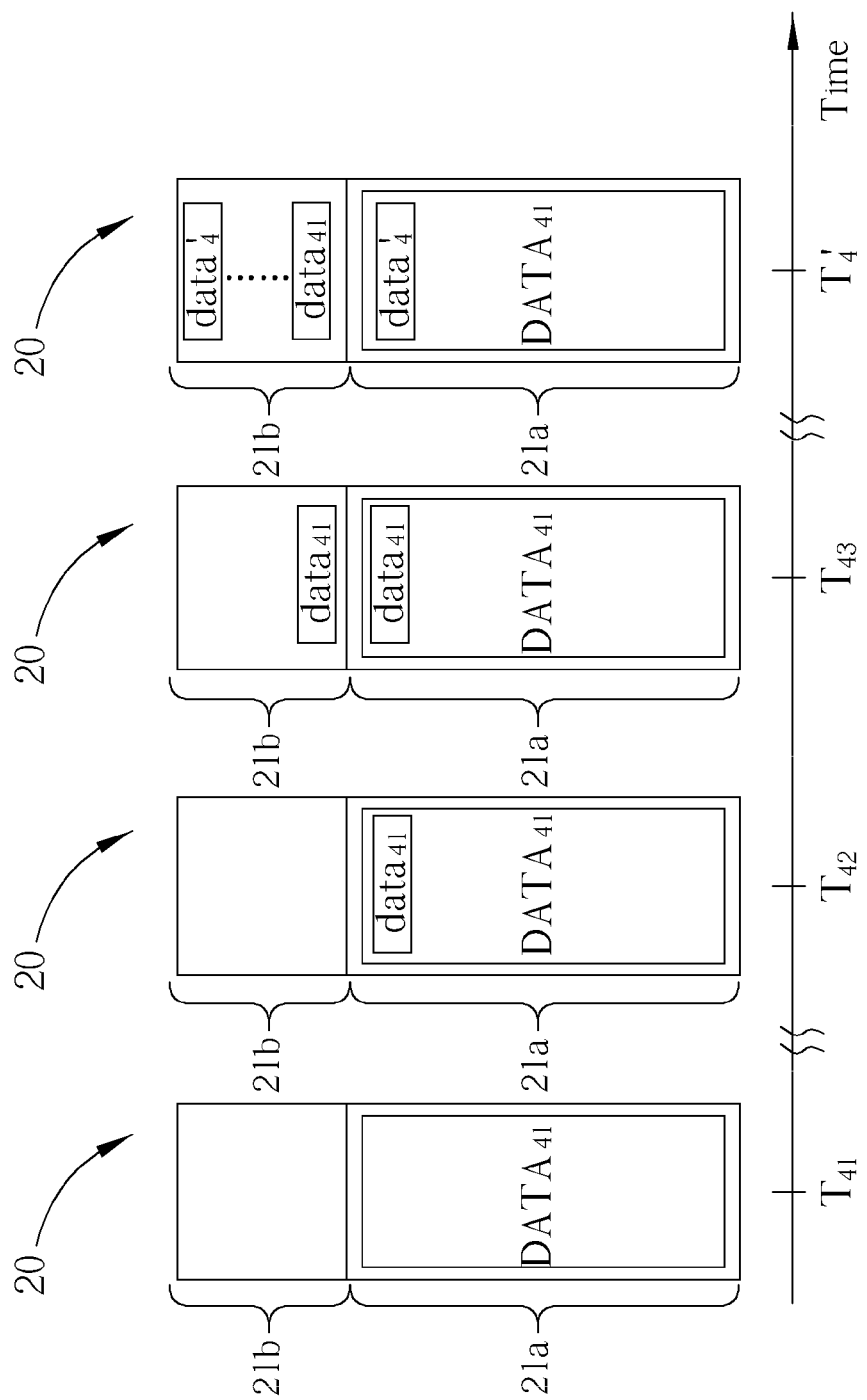
FIG. 9 is a schematic diagram illustrating a fourth conventional data managing method applied to the memory shown in FIG. 1.
Figure 10:
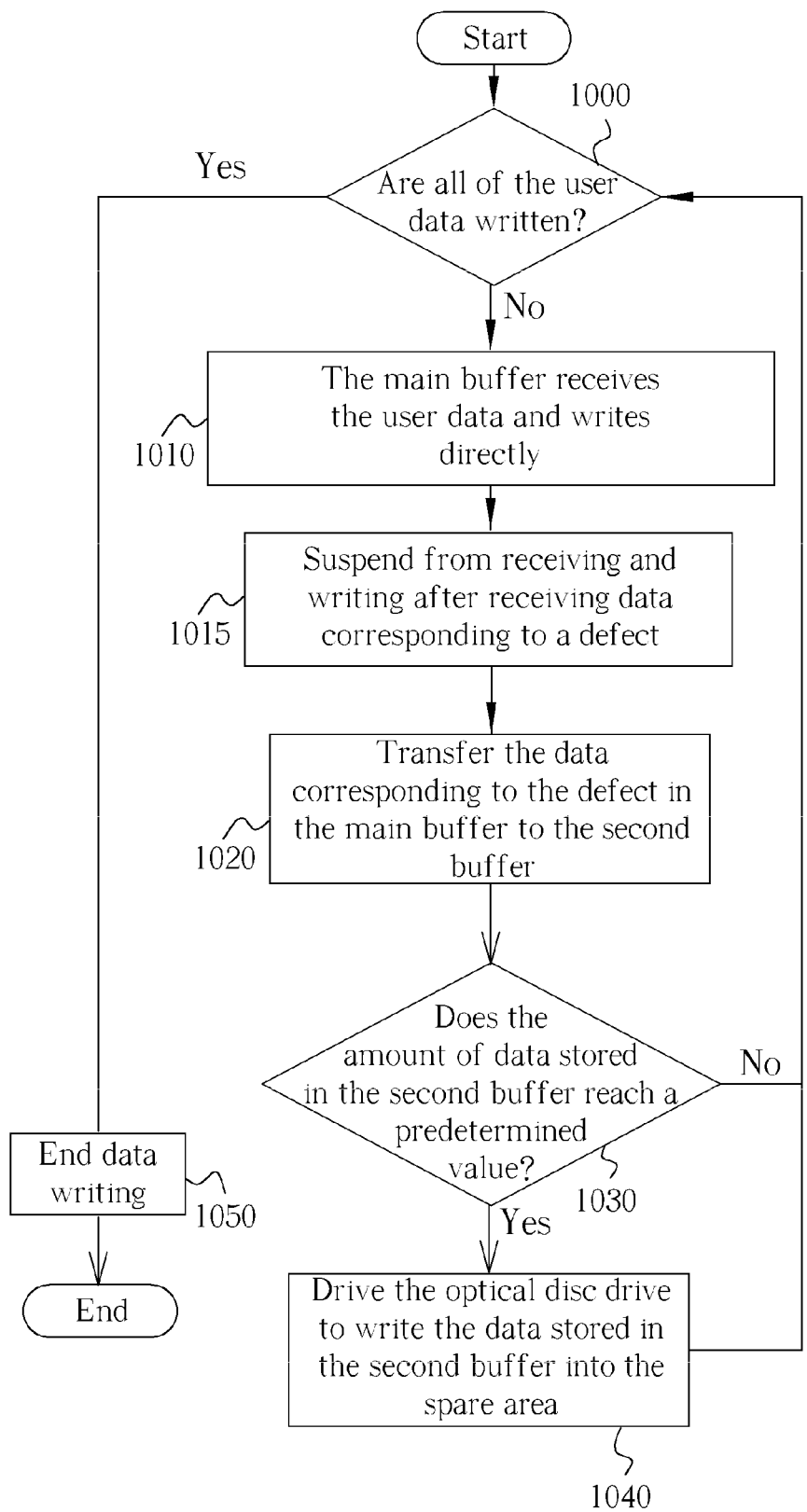
FIG. 10 is a flowchart illustrating management of the data corresponding to defects according to the fourth conventional data managing method.
Figure 11:
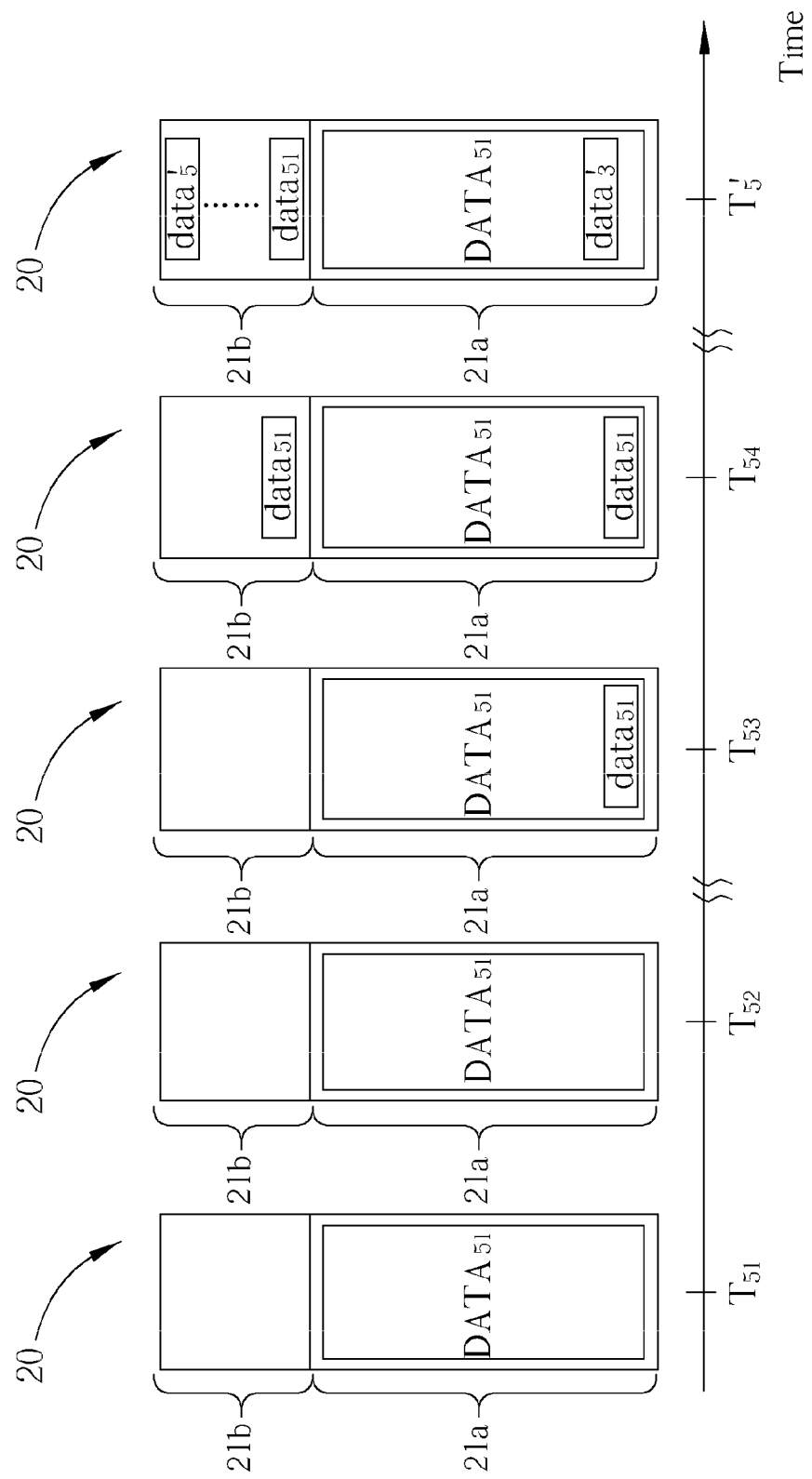
FIG. 11 is a schematic diagram illustrating a fifth conventional data managing method applied to the memory shown in FIG. 1.
Figure 12:
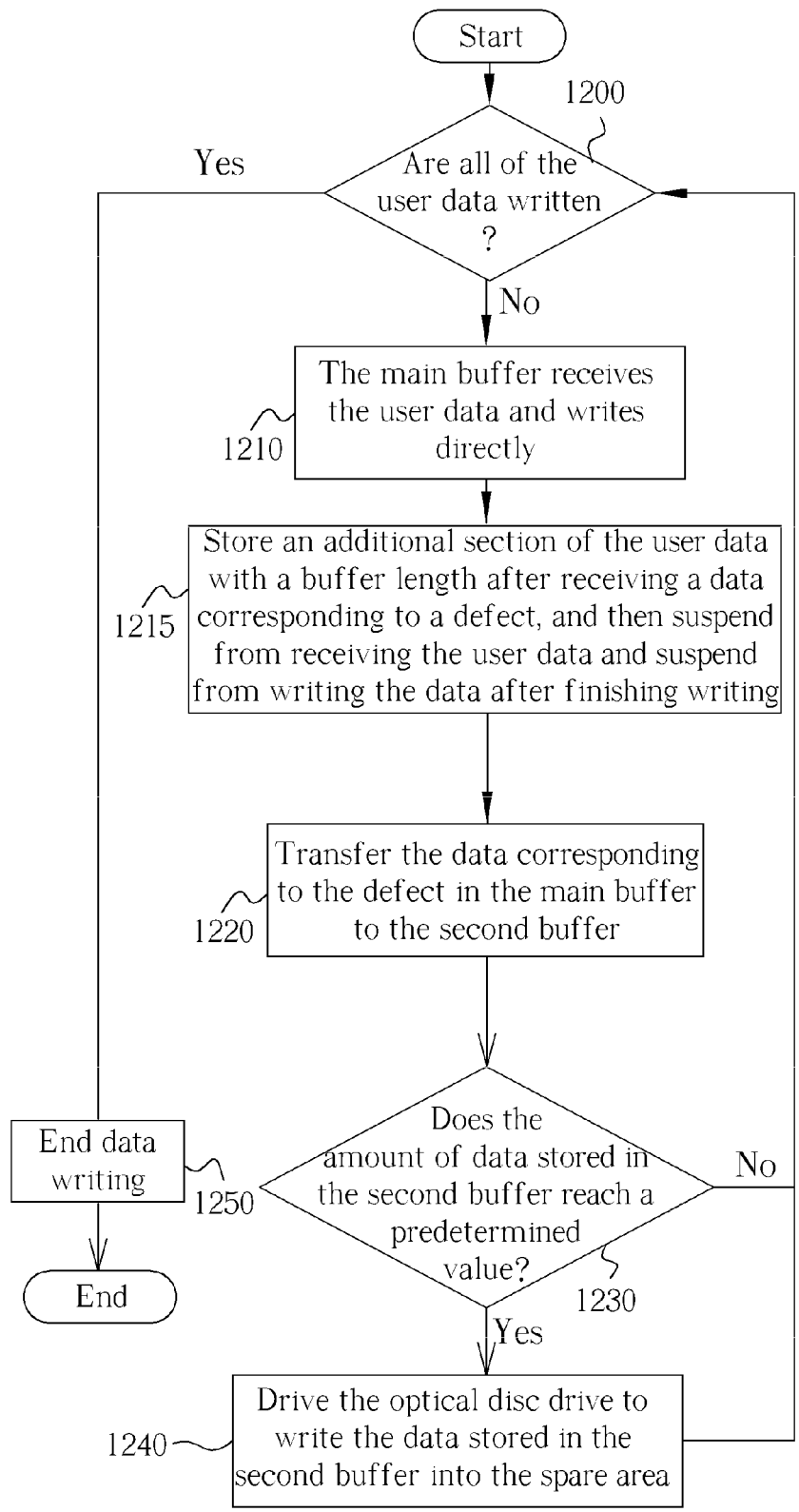
FIG. 12 is a flowchart illustrating management of the data corresponding to defects according to the fifth conventional data managing method.
Figure 13:
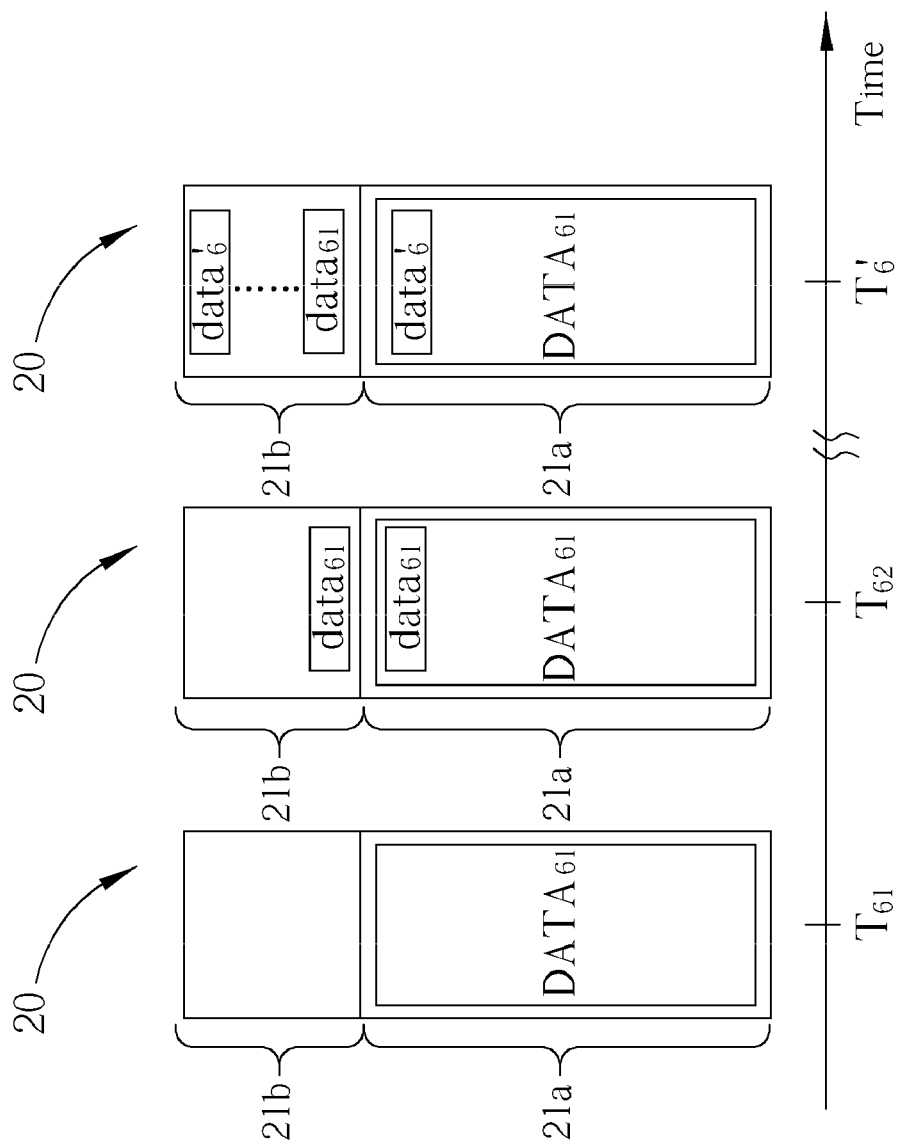
FIG. 13 is a schematic diagram illustrating a first data managing method of the present invention applied to the memory shown in FIG. 1.
Figure 14:
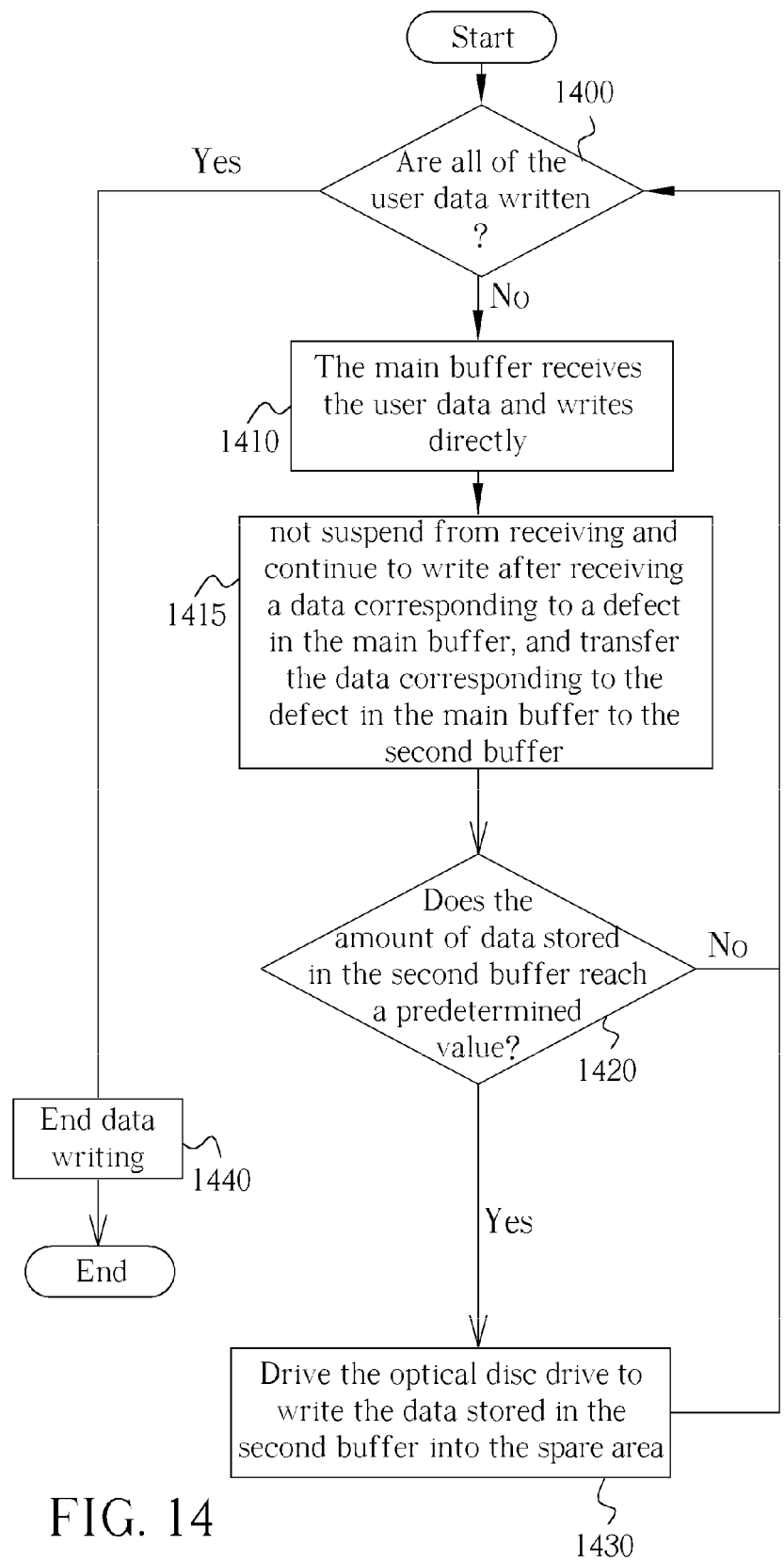
FIG. 14 is a flowchart illustrating management of the data corresponding to defects according to the first data managing method of the present invention.

Please refer to FIG. 1, FIG. 2, FIG. 13, and FIG. 14 simultaneously. FIG. 13 is a schematic diagram illustrating a first data managing method of the present invention applied to the memory 20 shown in FIG. 1. FIG. 14 is a flowchart illustrating management of the data corresponding to defects according to the first data managing method of the present invention. As shown in FIG. 1 and FIG. 2, the memory 20 includes a main buffer 21a and a second buffer 21b. The main buffer 21a is utilized for storing the data planned to be written into the user data area 27b on the optical disc 22, and the second buffer 21b is utilized for storing the data planned to be written into the spare area 27c on the optical disc 22. The operation of the first data managing method of the present invention is detailed as follows:

Step 1400: Are all of the user data written? If yes, proceed to step 1440; otherwise, proceed to step 1410.

Step 1410: The main buffer 21a first receives user data through the host 26 and then the optical disc drive 10 directly writes the received user data into the optical disc 22.

Step 1415: After the main buffer 21a receives a data corresponding to a defect on the optical disc 22, do not suspend the main buffer 21a from receiving the user data, continue reading data stored in the main buffer 21a for writing the data stored in the main buffer 21a into the optical disc, and transfer the data corresponding to a defect, and stored in the main buffer 21a, to the second buffer 21b.

Step 1420: Check if the amount of data stored in the second buffer 21b reaches a predetermined value. If yes, proceed to step 1430; otherwise, return to step 1400.

Step 1430: Suspend the main buffer 21a from receiving the user data and suspend the optical disc drive 10 from writing the data stored in the main buffer 21a into the user data area 27b. Drive the optical disc drive 10 to perform a seek to the spare area 27c, write the data stored in the second buffer 21b into the spare area 27c, perform a seek from the spare area 27c back to the user data area 27b, and then return to step 1400.

Step 1440: End data writing.

As shown in FIG. 13, at time $T_{61}$ the host 26 transfers the partial data $DATA_{61}$ corresponding to a user data into the main buffer 21a. The optical disc drive 10 then reads the partial data $DATA_{61}$ and further writes the partial data $DATA_{61}$ into the user data area 27b of the optical disc 22 (step 1410). At time $T_{62}$ the main buffer 21a receives the data ($data_{61}$) corresponding to a defect from the host 26. In this embodiment of the present invention, the main buffer 21a does not suspend immediately from receiving the following partial data $DATA_{61}$ corresponding to the user data, and the optical disc drive 10 will continue to read the data stored in the main buffer 21a and write the data stored in the main buffer 21a into the optical disc. Additionally, the optical disc drive 10 transfers the data ($data_{61}$) corresponding to a defect, and stored in the man buffer 21a, to the second buffer 21b (step 1415). Since the amount of data stored in the second buffer 21b does not reach a predetermined value, for example the second buffer 21b is not full (step 1420), the host 26 allows the optical disc drive 10 to continue transferring the partial data $DATA_{61}$ corresponding to the user data into the main buffer 21a. Then the optical disc drive 10 continues to read the partial data $DATA_{61}$ and further writes the partial data $DATA_{61}$ into the user data area 27b of the optical disc 22. At time $T_6'$, since the amount of data stored in the second buffer 21b reaches a predetermined value (e.g., the second buffer 21b is full), the main buffer 21a suspends from receiving the user data, and the optical disc drive 10 suspends from writing the data stored in the main buffer 21a into the user data area 27b. Then the optical disc drive 10 performs a seek to the spare area 27c, and writes the data ($data_{61}$-$data_6'$) stored in the second buffer 21b into the spare area 27c. The above-mentioned steps are repeated until all of the user data are written on the optical disc 22 (steps 1400 and 1440).

In step 1415, in order to prevent the situation that the above-mentioned data ($data_{61}$) corresponding to a defect is overwritten by the following new user data before the data ($data_{61}$) is completely transferred to the second buffer 21b, the data managing method of the present invention makes use of a software means (e.g., a mask flag). The usage of the mask flag is detailed as follows. When the main buffer 21a receives the data ($data_{61}$), a mask flag is set to prevent the data ($data_{61}$) from being overwritten by the following new user data before the data ($data_{61}$) is completely transferred into the second buffer 21b. If the main buffer 21a has another data corresponding to a next defect which is not yet transferred to the second buffer 21b, when the data ($data_{61}$) is completely transferred to the second buffer 21b, the data managing method of the present invention will set a mask flag associated with the data corresponding to the next defect for data protection. Additionally, if the main buffer 21a does not have another data corresponding to a next defect which is not yet transferred to the second buffer 21b, when the data ($data_{61}$) is completely transferred to the second buffer 21b, the data managing method of the present invention will clear the mask flag.

Figure 15:
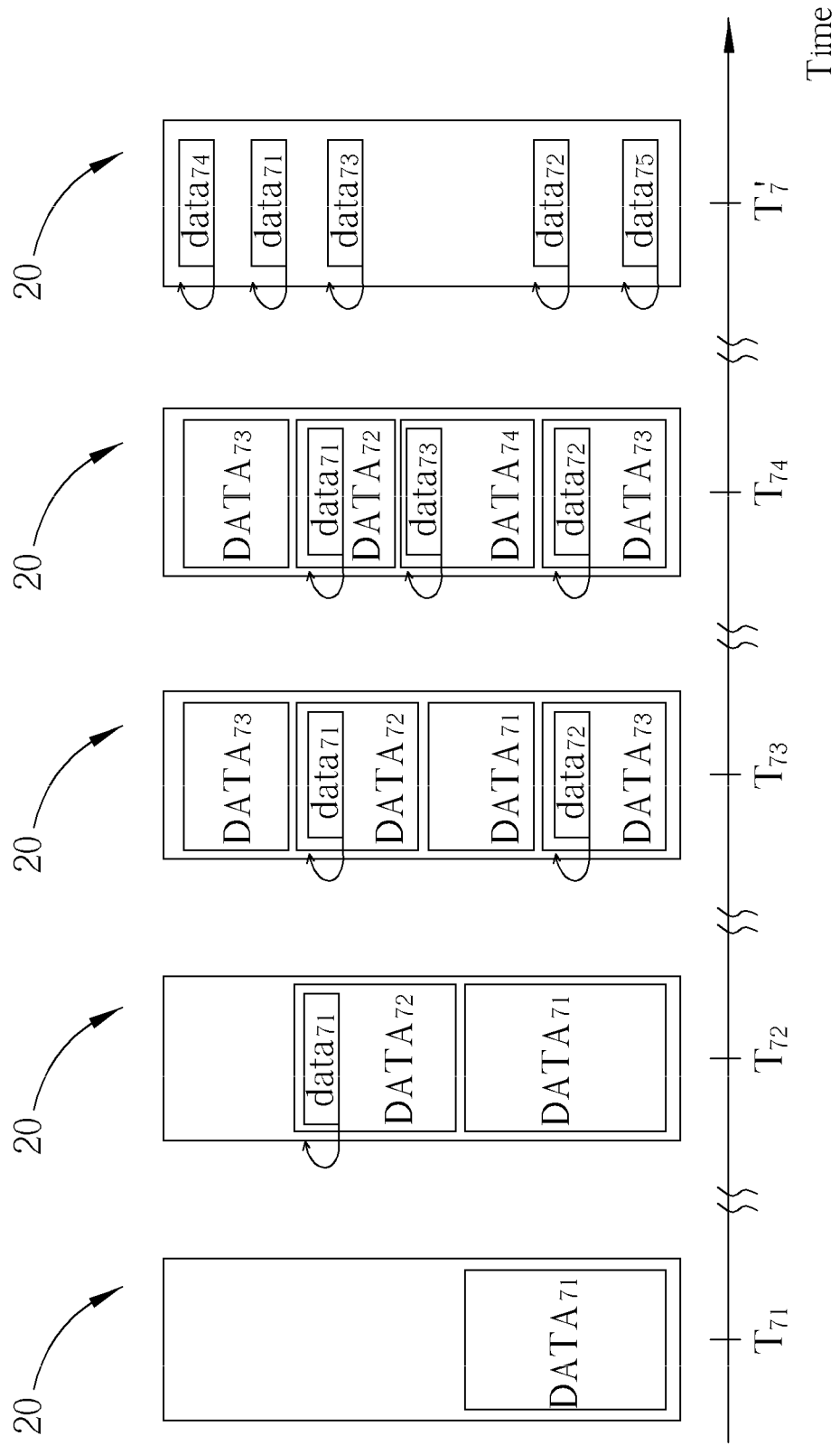
FIG. 15 is a schematic diagram illustrating a second data managing method of the present invention applied to the memory shown in FIG. 1.
Figure 16:
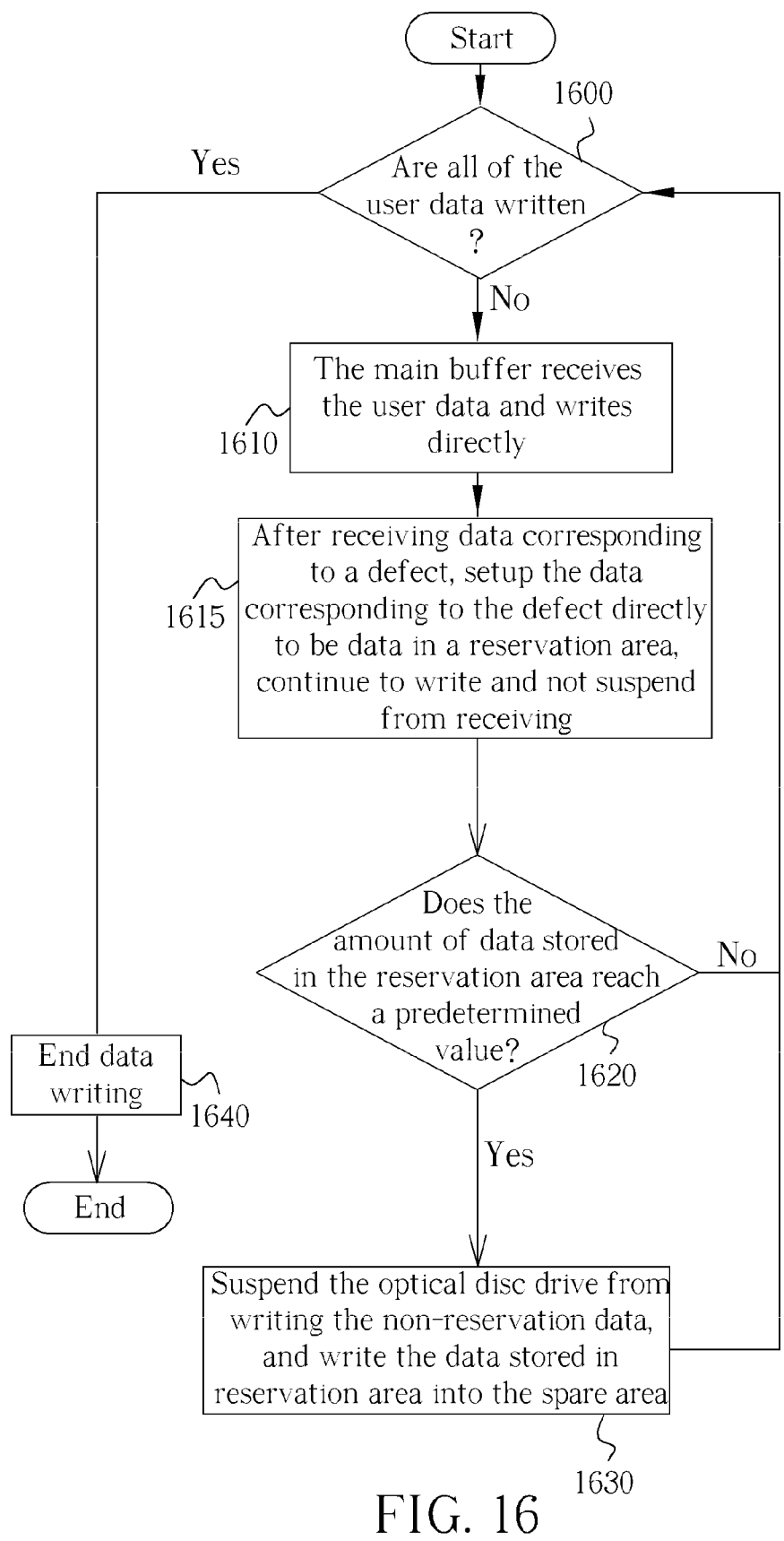
FIG. 16 is a flowchart illustrating management of the data corresponding to defects according to the second data managing method of the present invention.

Please refer to FIG. 1, FIG. 2, FIG. 15, and FIG. 16 simultaneously. FIG. 15 is a schematic diagram illustrating a second data managing method of the present invention applied to the memory 20 shown in FIG. 1. FIG. 16 is a flowchart illustrating management of the data corresponding to defects according to the second data managing method of the present invention. In this embodiment, the entire storage capacity of the memory 20 is utilized, and the memory 20 is not divided into a main buffer 21a and a second buffer 21b. The operation of the second data managing method of the present invention is detailed as follows:

Step 1600: Are all of the user data written? If yes, proceed to step 1640; otherwise, proceed to step 1610.

Step 1610: The memory 20 first receives user data through the host 26 and then the optical disc drive 10 directly writes the received user data into the optical disc 22.

Step 1615: After the memory 20 receives a data corresponding to a defect on the optical disc 22, directly set the data corresponding to the defect as data belonging to a reserved area and do not transfer the data corresponding to the defect to the reserved area. The optical disc drive 10 continues reading the data stored in the memory 20 and writing the data stored in the memory 20 into the optical disc 22, and the memory 20 does not suspend from receiving the user data.

Step 1620: Check if the amount of data belonging to the reserved area in the memory 20 reaches a predetermined value. If yes, proceed to step 1630; otherwise, return to step 1600.

Step 1630: Suspend the optical disc drive 10 from writing the data, which is stored in the memory 20 but does not belong to the reserved area, into the user data area 27b. Drive the optical disc drive 10 to perform a seek to the spare area 27c, write the data stored in the second buffer 21b into the spare area 27c, perform a seek from the spare area 27c back to the user data area 27b, and then return to step 1600.

Step 1640: End data writing.

As shown in FIG. 15, at time $T_{71}$ the host 26 transfers the partial data $DATA_{71}$ corresponding to a user data into the memory 20. The optical disc drive 10 then reads the partial data $DATA_{71}$ and further writes the partial data $DATA_{71}$ into the user data area 27b of the optical disc 22 (step 1610). At time $T_{72}$ the memory 20 receives the following partial data $DATA_{72}$ corresponding to the user data from the host 26, wherein the following partial data $DATA_{72}$ includes data ($data_{71}$) corresponding to a defect. In this embodiment of the present invention, when the memory 20 receives the data ($data_{71}$), the data ($data_{71}$) corresponding to a defect is directly set as data belonging to a reserved area and therefore does not need to be transferred into the reserved area. Moreover, the memory 20 does not suspend from receiving the following partial data $DATA_{73}$ corresponding to the user data, and the optical disc drive 10 continues reading the data stored in the memory 20 and writing the data stored in the memory 20 into the optical disc 22 (step 1615). Since the amount of data belonging to the reserved area in the memory 20 does not reach a predetermined value (step 1620), the host 26 allows the optical disc drive 10 to continue transferring the partial data $DATA_{73}$ corresponding to the user data into the memory 20. Then the optical disc drive 10 continues to read the data in the memory 20 and further writes the data into the user data area 27b of the optical disc 22. At time $T_{73}$, the memory 20 receives the data ($data_{72}$) corresponding to a defect in the following partial data $DATA_{73}$ corresponding to the user data from the host 26. Then, the data ($data_{72}$) corresponding to a defect is directly set as data belonging to the reserved area and therefore does not need to be transferred into the reserved area. Moreover, the memory 20 does not suspend from receiving the following partial data $DATA_{74}$ corresponding to the user data, and the optical disc drive 10 continues reading the data stored in the memory 20 and writing the data stored in the memory 20 into the optical disc 22 (step 1615). Since the amount of data belonging to the reserved area in the memory 20 does not reach a predetermined value (step 1620), the host 26 allows the optical disc drive 10 to continue transferring the partial data $DATA_{74}$ corresponding to the user data into the memory 20. Then the optical disc drive 10 continues to read the data in the memory 20 and further writes the data into the user data area 27b of the optical disc 22.

Similarly, at time $T_{74}$ the memory 20 receives the data ($data_{73}$) corresponding to a defect in the following partial data $DATA_{74}$ corresponding to the user data from the host 26. Therefore, the data ($data_{73}$) corresponding to a defect is directly set as data belonging to the reserved area and does not need to be transferred to the reserved area (step 1615). Since the amount of data belonging to the reserved area in the memory 20 does not reach a predetermined value (step 1620), the host 26 allows the optical disc drive 10 to continue transferring the partial data $DATA_{74}$ corresponding to the user data into the memory 20. Then the optical disc drive 10 continues to read the data in the memory 20 and further writes the data into the user data area 27b of the optical disc 22. Until time $T_7'$, since the amount of data belonging to the reserved area in the memory 20 reaches a predetermined value (step 1620), the memory 20 suspends from receiving the user data, and the optical disc drive 10 suspends from writing the data stored in the main buffer 21a into the user data area 27b. Then the optical disc drive 10 performs a seek to the spare area 27c, and writes the data ($data_{71}$-$data_{75}$) corresponding to the data of the reserved area in the memory 20 into the spare area 27c. The above-mentioned steps are repeated until all of the user data are written on the optical disc 22 (steps 1600 and 1640).

Please note that, in step 1615, when the memory 150 receives the data, corresponding to a defect, of the user data, the data managing method of the present invention utilizes the re-mapping or slipping means, indicated by arrows shown in FIG. 15, to record the starting address and the ending address of the data corresponding to a defect and to avoid the data corresponding to a defect from being overwritten by newly received user data. Moreover, a table or a link list can also be utilized in the data managing method of the present invention for recording the address information of the data corresponding to defects according to the sequence of storing the data corresponding to defects into the memory 20. Then, in step 1630, according to the above table or the link list, the data belonging to the reserved area that are randomly stored in the memory 20 can be written correctly into the spare area 27c. Please note that, in this embodiment the above-mentioned table or link list can be recorded in free space of at least a block of the memory 20 to avoid any wasting in the use of memory.

Figure 17:
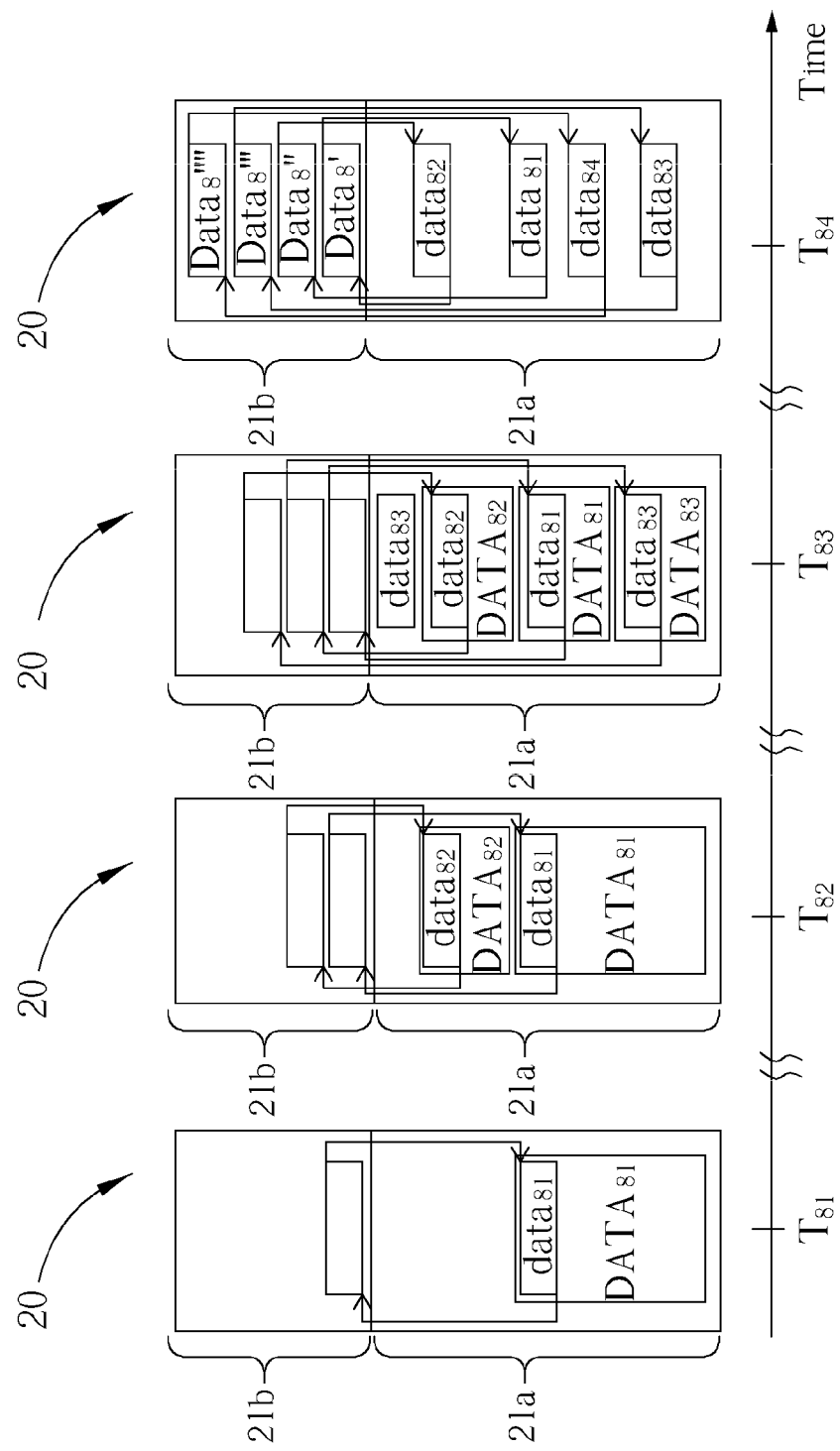
FIG. 17 is a schematic diagram illustrating a third data managing method of the present invention applied to the memory shown in FIG. 1.
Figure 18:
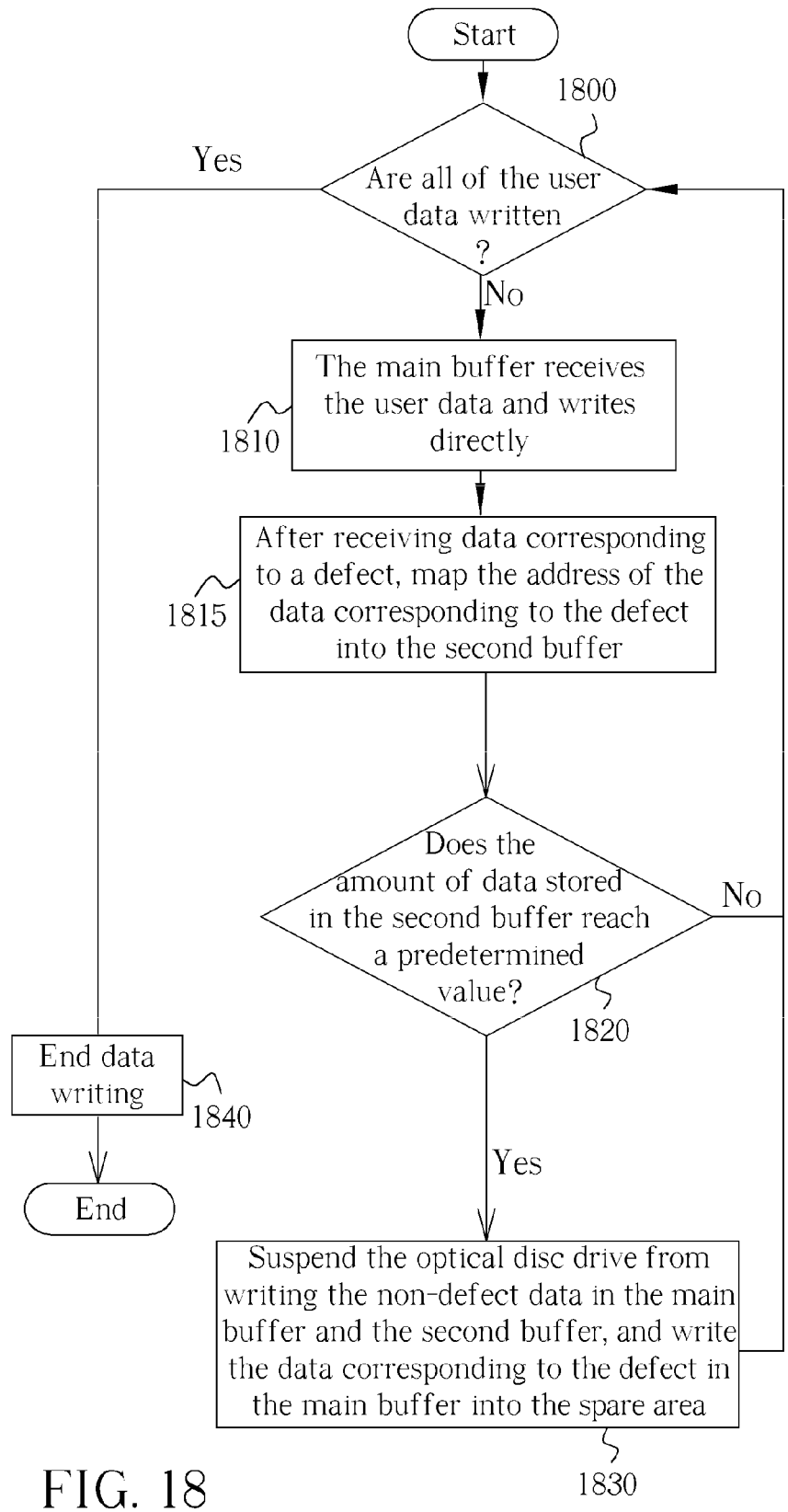
FIG. 18 is a flowchart illustrating management of the data corresponding to defects according to the third data managing method of the present invention.

Please refer to FIG. 1, FIG. 2, FIG. 17, and FIG. 18 simultaneously. FIG. 17 is a schematic diagram illustrating a third data managing method of the present invention applied to the memory 20 shown in the FIG. 1. FIG. 18 is a flowchart illustrating management of the data corresponding to defects according to the third data managing method of the present invention. The operation of the third data managing method of the present invention is detailed as follows:

Step 1800: Are all of the user data written? If yes, proceed to step 1840; otherwise, proceed to step 1810.

Step 1810: The main buffer 21a first receives the user data through the host 26 and then the optical disc drive 10 directly writes the received user data into the optical disc 22.

Step 1815: When the main buffer 21a receives a data corresponding to a defect on the optical disc 22, the memory 20 maps the starting address of the data corresponding to a defect into an address in the second buffer 21b and maps another address in the second buffer 21b into the ending address of the data corresponding to a defect.

Step 1820: Check if the amount of data stored in the second buffer 21b reaches a predetermined value. If yes, proceed to step 1830; otherwise, return to step 1800.

Step 1830: Suspend the optical disc drive 10 from writing the data, which are stored in the main buffer 21a and the second buffer 21b but not the data corresponding to defects, into the user data area 27b. Drive the optical disc drive 10 to perform a seek to the spare area 27c, write the data correspond to defects stored in the main buffer 21a into the spare area 27c, perform a seek from the spare area 27c back to the user data area 27b, and then return to step 1800.

Step 1840: End data writing.

In this embodiment, the host 26 transfers the partial data $DATA_{81}$ corresponding to the user data into the main buffer 21a, and the optical disc drive 10 also reads the partial data $DATA_{61}$ and further writes the partial data $DATA_{61}$ into the user data area 27b of the optical disc 22 (step 1810). At time $T_{81}$, the main buffer 21a receives the data ($data_{81}$) corresponding to a defect in the partial data $DATA_{81}$, and the memory 20 maps the starting address of the data (data$_{81}$) into a first address in the second buffer 21b and maps a second address in the second buffer 21b into the ending address of the data (data$_{81}$) (step 1815). That is, the storage space defined by the first and second addresses has the same data amount as the data (data$_{81}$), and this storage space defined by the first and second addresses can be utilized for storing the data that does not correspond to a defect later. Meanwhile, since the amount of data stored in the second buffer 21b does not reach a predetermined value, for example, the second buffer 21b is not full (step 1820), the main buffer 21a continues to receive the following partial data DATA$_{82}$ corresponding to the user data. At time T$_{82}$, the main buffer 21a receives the data (data$_{82}$) corresponding to a defect in the partial data DATA$_{82}$. As mentioned above, the memory 20 then maps the starting address of the data (data$_{82}$) into a third address in the second buffer 21b, and maps a fourth address in the second buffer 21b into the ending address of the data (data$_{82}$) (step 1815). Similarly, since the amount of data stored in the second buffer 21b does not reach a predetermined value, for example, the second buffer 21b is not full (step 1820), and the main buffer 21a continues to receive the following partial data DATA$_{83}$ corresponding to the user data. At time T$_{83}$, the main buffer 21a receives the data (data$_{83}$) corresponding to a defect in the partial data DATA$_{83}$. As mentioned above, the memory then maps the starting address of the data (data$_{83}$) into a fifth address in the second buffer 21b, and maps a sixth address in the second buffer 21b into the ending address of the data (data$_{83}$) (step 1815). As shown in FIG. 17, at time T$_{84}$, since the amount of data stored in the second buffer 21b (i.e., the data DATA$_8$'-DATA$_8$") which do not correspond to defects) reaches a predetermined value (e.g., the second buffer 21b is full). Therefore, the memory 20 suspends from receiving the user data, and the optical disc drive 10 suspends from writing the data, which are stored in the main buffer 21a and the second buffer 21b but not the data correspond to defects, into the user data area 27b. Then the optical disc drive 10 performs a seek to the spare area 27c, and writes the data (data$_{81}$-data$_{84}$) stored in the second buffer 21b into the spare area 27c. The above-mentioned steps are repeated until all of the user data are written on the optical disc 22 (steps 1800 and 1840).

Please note that, in step 1815, a table, or a link list can also be utilized in the data managing method of the present invention for recording the starting address and the ending address of the data (data$_{81}$-data$_{84}$) which respectively correspond to specific mapping addresses of the second buffer 21b. Therefore, in step 1830, the data (data$_{81}$-data$_{84}$) corresponding to a plurality of defects which are randomly stored in the main buffer 21a can be written correctly into the spare area 27c according to the recorded sequence in the list or the link list. Moreover, the above-mentioned table and link list can be stored in free space of at least a block in the memory 20 for further saving memory usage.

Figure 19:
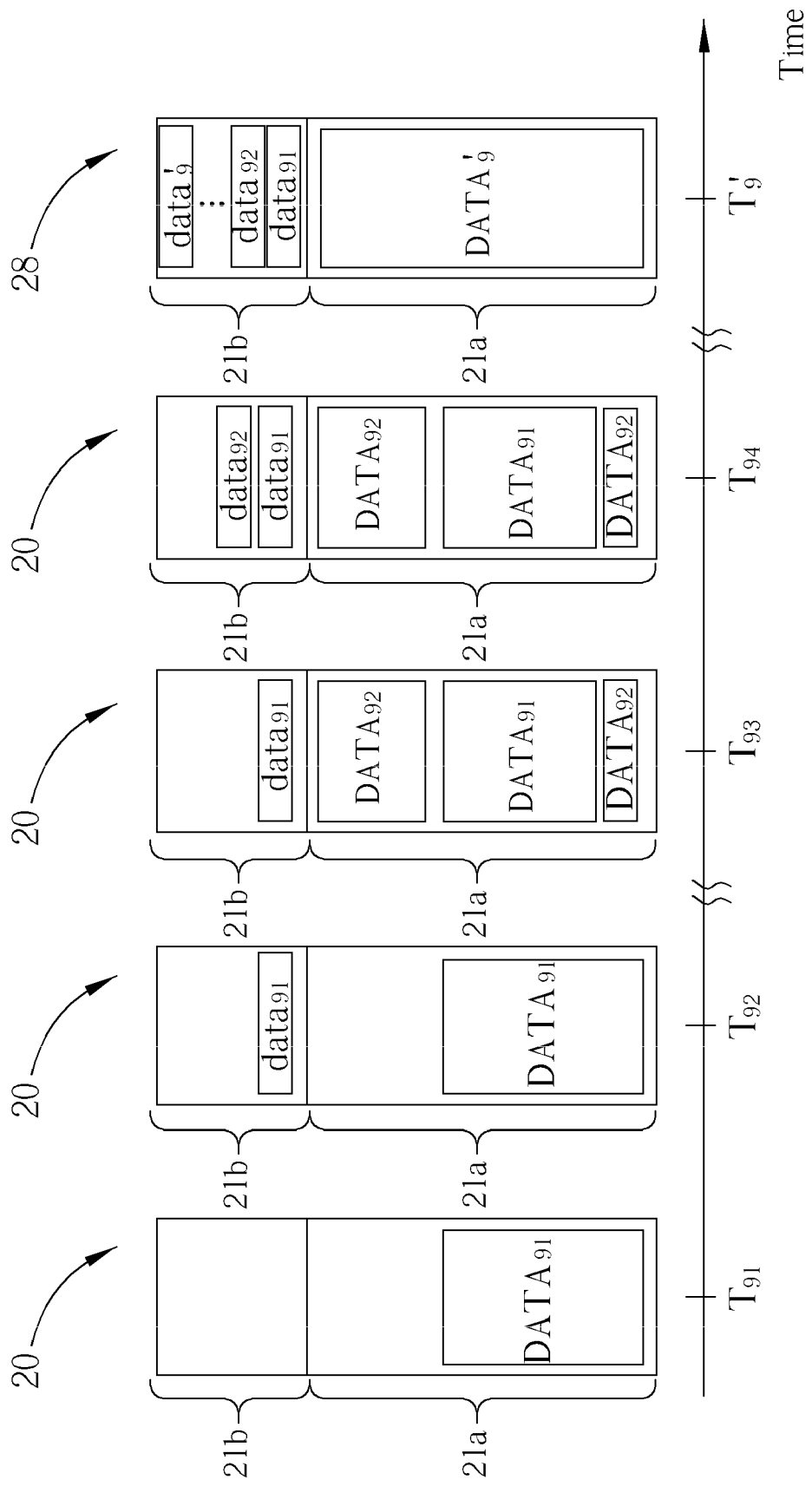
FIG. 19 is a schematic diagram illustrating a fourth data managing method of the present invention applied to the memory shown in FIG. 1.
Figure 20:
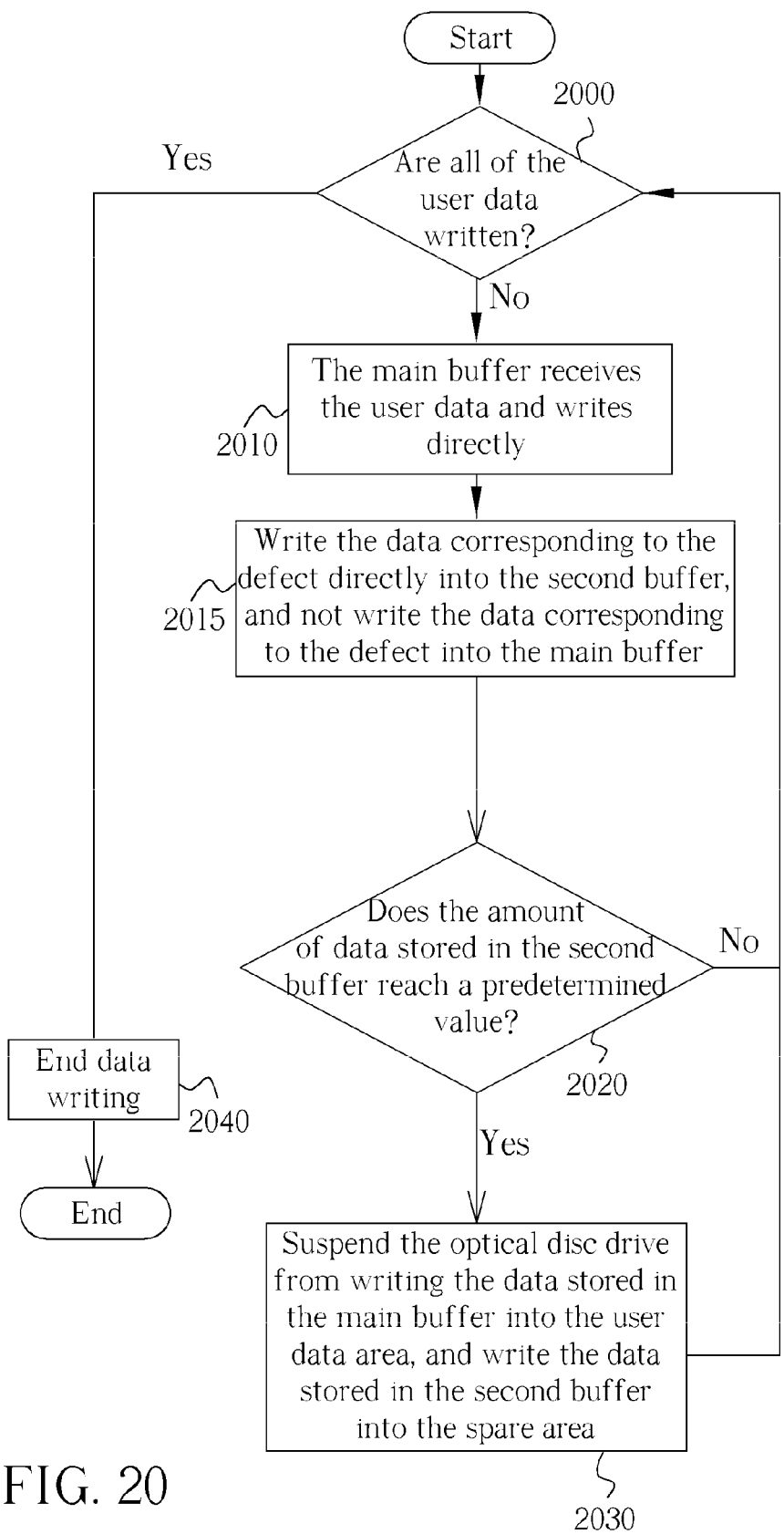
FIG. 20 is a flowchart illustrating management of the data corresponding to defects according to the fourth data managing method of the present invention.

Please refer to FIG. 1, FIG. 2, FIG. 19, and FIG. 20 simultaneously. FIG. 19 is a schematic diagram illustrating a fourth data managing method of the present invention applied to the memory 20 shown in FIG. 1. FIG. 20 is a flowchart illustrating management of the data corresponding to defects according to the fourth data managing method of the present invention. The operation of the fourth data managing method of the present invention is detailed as follows:

Step 2000: Are all of the user data written? If yes, proceed to step 2040; otherwise, proceed to step 2010.

Step 2010: The main buffer 21a first receives the user data through the host 26 and then the optical disc drive 10 directly writes the received user data into the optical disc 22.

Step 2015: After the main buffer 21a receives a data corresponding to a defect on the optical disc 22, write the data corresponding to a defect directly into the second buffer 21b, and not write the data corresponding to a defect into the main buffer 21a.

Step 2020: Check if the amount of data stored in the second buffer 21b reaches a predetermined value. If yes, proceed to step 2030; otherwise, return to step 2000.

Step 2030: Suspend the optical disc drive 10 from writing the data stored in the main buffer 21a into the user data area 27b. Drive the optical disc drive 10 to perform a seek to the spare area 27c, write the data stored in the second buffer 21b into the spare area 27c, perform a seek from the spare area 27c back to the user data area 27b, and then return to step 2000.

Step 2040: End data writing.

At time T$_{91}$, the host 26 transfers the partial data DATA$_{91}$ corresponding to a user data into the main buffer 21a. The optical disc drive 10 then reads the partial data DATA$_{91}$ and further writes the partial data DATA$_{91}$ into the user data area 27b of the optical disc 22 (step 2010). However, at time T$_{92}$, the host 26 prepares to transfer the data (data$_{91}$) corresponding to a defect into the memory 20. The optical disc drive 10 then controls the memory 20 to write the data (data$_{91}$) directly into the second buffer 21b, and not to write the data (data$_{91}$) in to the main buffer 21a (step 2015). Meanwhile, since the amount of data stored in the second buffer 21b does not reach a predetermined value, for example, the second buffer 21b is not full (step 2020), the main buffer 21a continues to receive the following partial data corresponding to the user data. At Time T$_{93}$, the host 26 already transfers the partial data DATA$_{92}$ corresponding to the user data into the main buffer 21a. The optical disc drive 10 then reads the data stored in the main buffer 21a and further writes the data into the user data area 27b of the optical disc 22 (step 2010). However, at time T$_{94}$, the host 26 prepares to transfer the data (data$_{92}$) corresponding to a defect into the memory 20. As mentioned above, the optical disc drive 10 then controls the memory 20 to write the data (data$_{92}$) directly into the second buffer 21b, and not to write the data (data$_{92}$) in to the main buffer 21a (step 2015). Meanwhile, since the amount of data stored in the second buffer 21b does not reach a predetermined value, for example, the second buffer 21b is not full (step 2020), the main buffer 21a continues to receive the following partial data corresponding to the user data. As shown in FIG. 19, at time T$_9$', the partial data DATA$_9$' is stored in the main buffer 21a, and since the amount of data stored in the second buffer 21b reaches a predetermined value (e.g., the second buffer 21b is full), at this time the memory 20 suspends from receiving the user data, and the optical disc drive 10 suspends from writing the data stored in the main buffer 21a into the user data area 27b. Then the optical disc drive 10 performs a seek to the spare area 27c, and writes the data (data$_{91}$-data$_9$') stored in the second buffer 21b into the spare area 27c. The above-mentioned steps are repeated until all of the user data are written on the optical disc 22 (steps 2000 and 2040).

Figure 21:
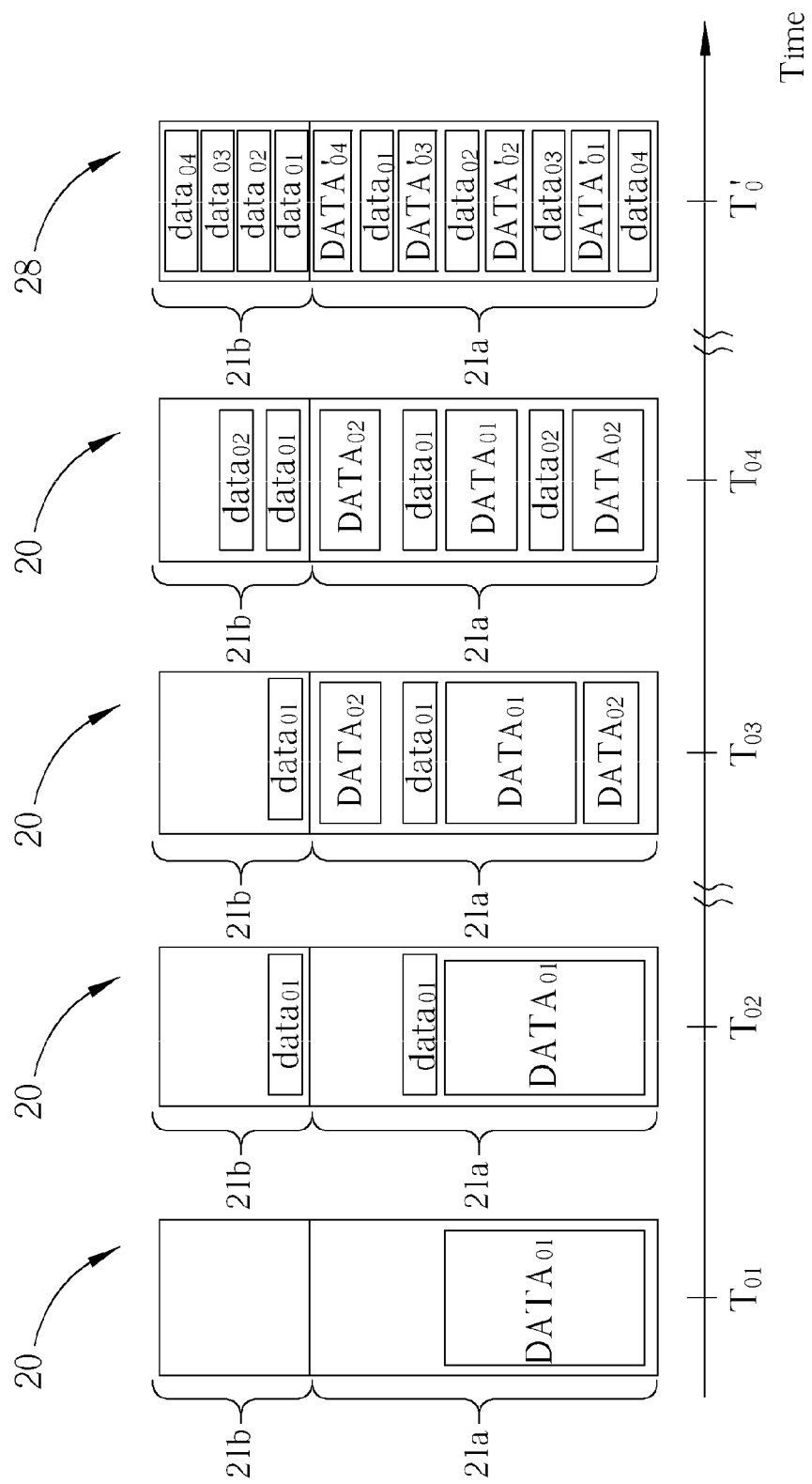
FIG. 21 is a schematic diagram illustrating a fifth data managing method of the present invention applied to the memory shown in FIG. 1.
Figure 22:
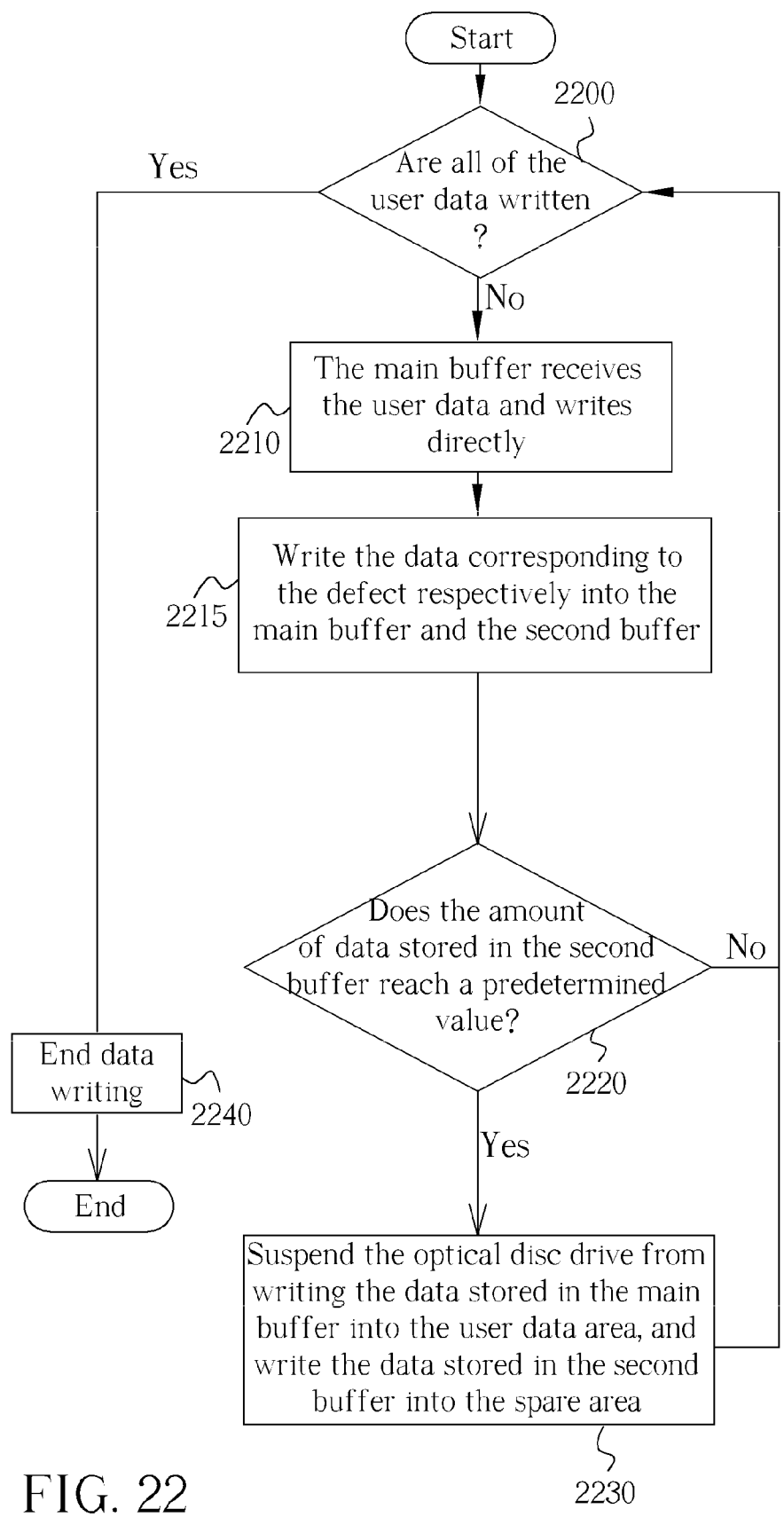
FIG. 22 is a flowchart illustrating management of the data corresponding to defects according to the fifth data managing method of the present invention.

Please refer to FIG. 1, FIG. 2, FIG. 21, and FIG. 22 simultaneously. FIG. 21 is a schematic diagram illustrating a fifth data managing method of the present invention applied to the memory 20 shown in FIG. 1. FIG. 22 is a flowchart illustrating management of the data corresponding to defects according to the fifth data managing method of the present invention. The operation of the fifth data managing method of the present invention is detailed as follows:

Step 2200: Are all of the user data written? If yes, proceed to step 2040; otherwise, proceed to step 2010.

Step 2210: The main buffer 21a first receives the user data through the host 26 and the optical disc drive 10 directly writes the received user data into the optical disc 22.

Step 2215: When a data corresponding to a defect on the optical disc 22 is preparing to be stored into the memory 20, write the data corresponding to the defect into the main buffer 21a and the second buffer 21b, respectively.

Step 2220: Check if the amount of data stored in the second buffer 21b reaches a predetermined value. If yes, proceed to step 2230; otherwise, return to step 2200.

Step 2230: Suspend the optical disc drive 10 from writing the data stored in the main buffer 21a into the user data area 27b, and drive the optical disc drive 10 to perform a seek to the spare area 27c, write the data stored in the second buffer 21b into the spare area 27c, perform a seek from the spare area 27c back to the user data area 27b, and then return to step 2200.

Step 2240: End data writing.

At time $T_{01}$, the host 26 transfers the partial data $DATA_{01}$ corresponding to a user data into the main buffer 21a. The optical disc drive 10 then reads the partial data $DATA_{01}$ and further writes the partial data $DATA_{01}$ into the user data area 27b of the optical disc 22 (step 2210). However, at time $T_{02}$, the host 26 prepares to transfer the data ($data_{o1}$) corresponding to a defect into the memory 20. The optical disc drive 10 then controls the memory 20 to write the data ($data_{o1}$) respectively into the main buffer 21a and the second buffer 21b (step 2215). Meanwhile, since the amount of data stored in the second buffer 21b does not reach a predetermined value, for example, the second buffer 21b is not full (step 2220), the main buffer 21a continues to receive the following partial data corresponding to the user data. At Time $T_{03}$, the host 26 already transfers the partial data $DATA_{02}$ corresponding to a user data into the main buffer 21a. The optical disc drive 10 then reads the data stored in the main buffer 21a and further writes the data into the user data area 27b of the optical disc 22 (step 2210). However, at time $T_{04}$, the host 26 prepares to transfer the data ($data_{o2}$) corresponding to a defect into the memory 20. As mentioned above, the optical disc drive 10 then controls the memory 20 to write the data ($data_{92}$) respectively into the main buffer 21a and the second buffer 21b (step 2215). Meanwhile, since the amount of data stored in the second buffer 21b does not reach a predetermined value, for example, the second buffer 21b is not full (step 2220), the main buffer 21a continues to receive the following partial data corresponding to the user data. As shown in FIG. 20, at time $T_0'$, the main buffer 21a has already stored a plurality of the partial data $DATA_{01}'$-$DATA_{04}'$ corresponding to the user data and the data ($data_{o1}$-$data_{o4}$) corresponding to a plurality of defects, and since the amount of data stored in the second buffer 21b reaches a predetermined value (e.g., the second buffer 21b is full) (step 2220), at this time the memory 20 suspends from receiving the user data, and the optical disc drive 10 suspends from writing the data stored in the main buffer 21a into the user data area 27b. Then the optical disc drive 10 performs a seek to the spare area 27c, and writes the data ($data_{o1}$-$data_{o4}$) stored in the second buffer 21b into the spare area 27c. The above-mentioned steps are repeated until all of the user data are written on the optical disc 22 (steps 2200 and 2240).

Figure 23:
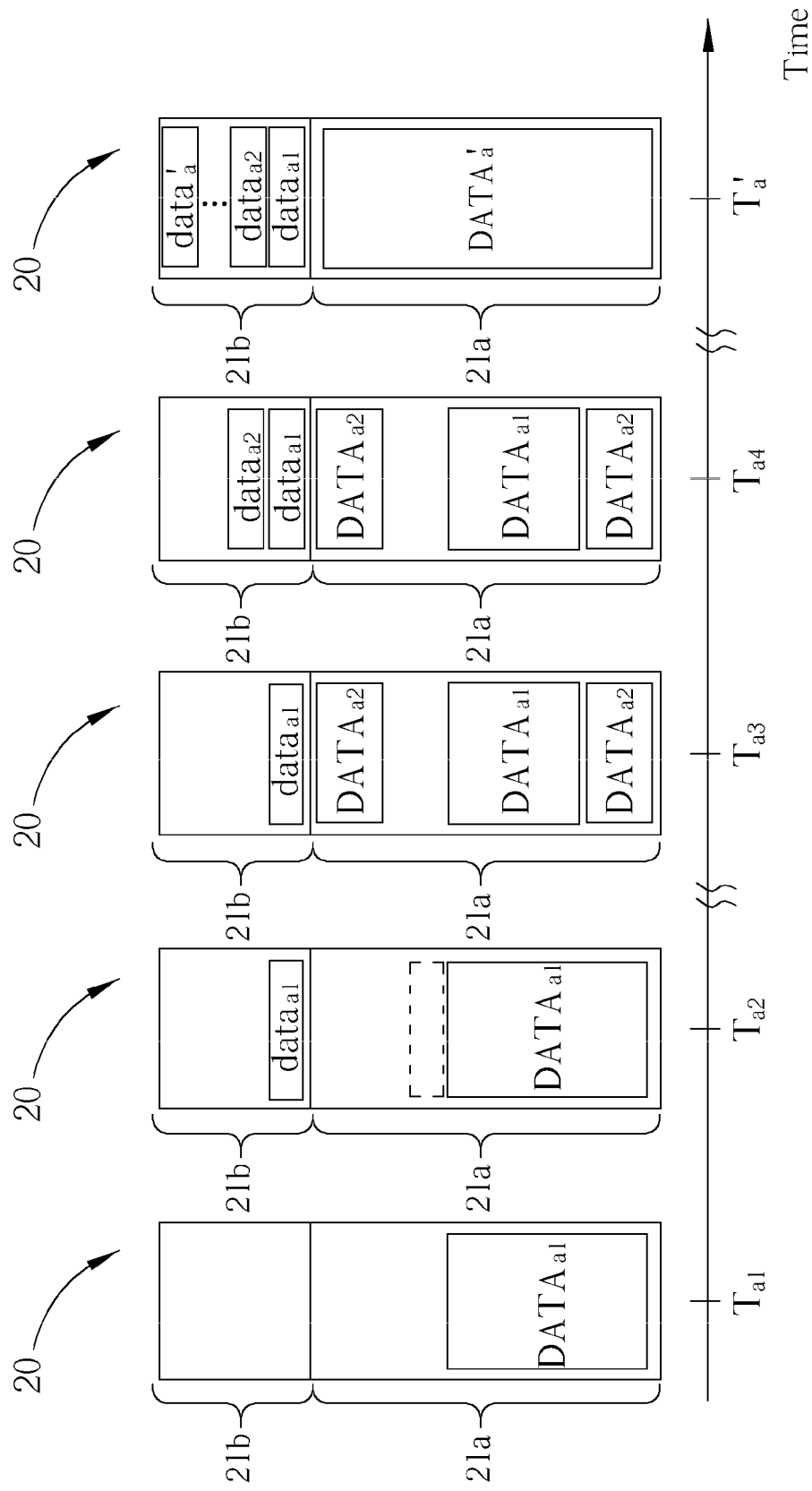
FIG. 23 is a schematic diagram illustrating a sixth data managing method of the present invention applied to the memory shown in FIG. 1.
Figure 24:
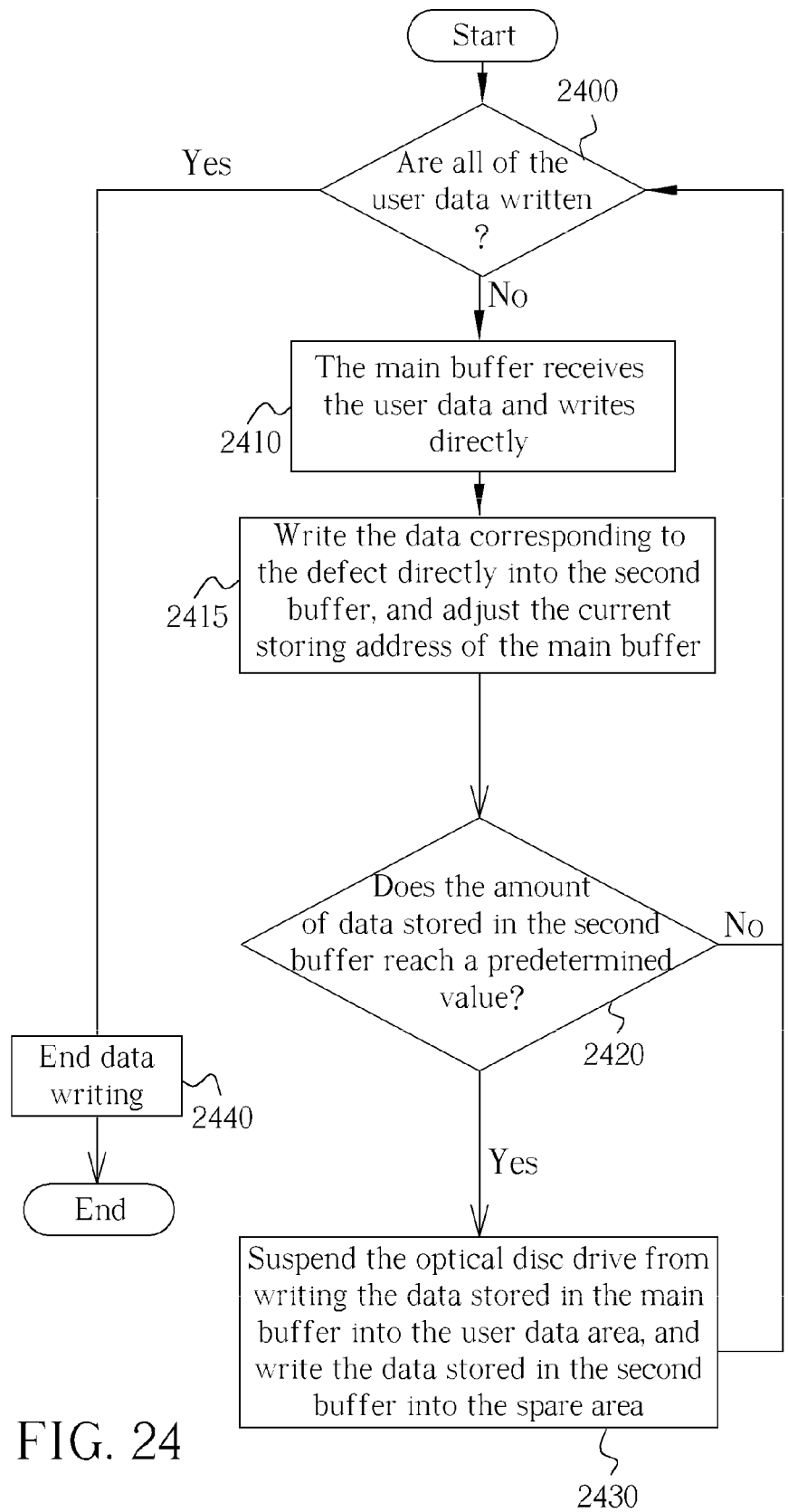
FIG. 24 is a flowchart illustrating management of the data corresponding to defects according to the sixth data managing method of the present invention.

Please refer to FIG. 1, FIG. 2, FIG. 23, and FIG. 24 simultaneously. FIG. 23 is a schematic diagram illustrating a sixth data managing method of the present invention applied to the memory 20 shown in FIG. 1. FIG. 24 is a flowchart illustrating management of the data corresponding to defects according to the sixth data managing method of the present invention. The operation of the sixth data managing method of the present invention is detailed as follows:

Step 2400: Are all of the user data written? If yes, proceed to step 4040; otherwise, proceed to step 2410.

Step 2410: The main buffer 21a first receives the user data through the host 26 and then the optical disc drive 10 directly writes the received user data into the optical disc 22.

Step 2415: When a data corresponding to a defect in the optical disc 22 is preparing to be stored into the memory 20, write the data corresponding to the defect directly into the second buffer 21b, and adjust the current storing address of the main buffer 21a to jump to a storage area, wherein the data length of the storage area is equal to the data length of the data corresponding to the defect.

Step 2420: Check if the amount of data stored in the second buffer 21b reaches a predetermined value. If yes, proceed to step 2430; otherwise, return to step 2400.

Step 2430: Suspend the optical disc drive 10 from writing the data stored in the main buffer 21a into the user data area 27b, and drive the optical disc drive 10 to perform a seek to the spare area 27c, write the data stored in the second buffer 21b into the spare area 27c, perform a seek from the spare area 27c back to the user data area 27b, and then return to step 2400.

Step 2440: End data writing.

At time $T_{a1}$, the host 26 transfers the partial data $DATA_{a1}$ corresponding to a user data into the main buffer 21a. The optical disc drive 10 then reads the partial data $DATA_{a1}$ and further writes the partial data $DATA_{a1}$ into the user data area 27b of the optical disc 22 (step 2410). However, at time $T_{a2}$, the host 26 prepares to transfer the data ($data_{a1}$) corresponding to a defect into the memory 20. The optical disc drive 10 then controls the memory 20 to write the data ($data_{a1}$) into the second buffer 21b but not to write the data ($data_{a1}$) into the main buffer 21a (step 2415). Additionally, the optical disc drive 10 further controls the current storing address of the main buffer 21a to jump to a storage area shown by the dotted-line area in FIG. 23 and the amount of the storing area is equal to the data amount of the data ($data_{a1}$) (step 2415). Meanwhile, since the amount of data stored in the second buffer 21b does not reach a predetermined value, for example, the second buffer 21b is not full (step 2420), the main buffer 21a continues to receive the following partial data corresponding to the user data according to the adjusted storing address. At Time $T_{a3}$, the host 26 already transfers the partial data $DATA_{a2}$ corresponding to the user data into the main buffer 21a. The optical disc drive 10 then reads the data stored in the main buffer 21a and further writes the data into the user data area 27b of the optical disc 22 (step 2410). Similarly, at time $T_{a4}$, the host 26 prepares to transfer the data ($data_{a2}$) corresponding to a defect into the memory 20. As mentioned above, the optical disc drive 10 then controls the memory 20 to write the data ($data_{a2}$) into the second buffer 21b but not to write the data ($data_{a2}$) into the main buffer 21a. Additionally, the optical disc drive 10 further controls the current storing address of the main buffer 21a to jump to a storage area and the amount of the storing area is equal to the data amount of the data ($data_{a2}$) (step 2415). Meanwhile, since the amount of data stored in the second buffer 21b does not reach a predetermined value, for example, the second buffer 21b is not full (step 2420), the main buffer 21a continues to receive the following partial data corresponding to the user data according to the adjusted storing address. As shown in FIG. 23, at time $T_a'$, the main buffer 21a has already stored the partial data $DATA_a'$ corresponding to the user data, and since the amount of data stored in the second buffer 21b reaches a predetermined value (e.g., the second buffer 21b is full) (step 2420), at this time the memory 20 suspends from receiving the user data, and the optical disc drive 10 suspends from writing the data stored in the main buffer 21a into the user data area 27b. Then the optical disc drive 10 performs a seek to the spare area 27c, and writes the data (data$_{a1}$-data$_a$') stored in the second buffer 21b into the spare area 27c. The above-mentioned steps are repeated until all of the user data are written on the optical disc 22 (steps 2400 and 2440).

Please note that, a volatile memory, such as a dynamic random access memory (DRAM), can be utilized in the data managing method of the present invention. However, this is only an example of the type of memory in the data managing method of the present invention, and is not meant to be taken as a limitation. Additionally, the kinds of the optical disc are not limited to those discussed here. That is, the optical disc can be a digital versatile disc (DVD) (e.g., a DVD-R/RW optical disc or DVD+R/RW optical disc). Moreover, since the buffer length of the second buffer 21b can be equal to or greater than the buffer length of the main buffer 21a, the predetermined value can be equal to or greater than a buffer length corresponding to the main buffer. Finally, the above-mentioned embodiments are exampled by utilizing a main buffer and a second buffer. However, the configuration of the main buffer and second buffer is not meant to be taken as limitations in the present invention. That is, a plurality of main buffers and a plurality of second buffers can also be utilized in other embodiments of the present invention.

In contrast to the related art, it is not necessary for the data managing method of the present invention to suddenly suspend from the data recording operation while encountering a defect. As a result, the short seek time can be significantly reduced and the data recording performance of the optical disc drive can thereby be efficiently improved. Additionally, the data managing methods of the present invention (e.g., the second, third and fifth data managing methods) further save the time of transferring the data corresponding to a defect from the main buffer into the second buffer needed by the related art method. Therefore, the data recording performance of the optical disc drive can be improved considerably.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data managing method for an optical disc drive writing user data into an optical disc having defects, the optical disc drive comprising a first buffering space and a second buffering space, the first buffering space for storing data predetermined to be recorded into a user data area on the optical disc, the second buffering space for storing data predetermined to be recorded into a spare area on the optical disc, the data managing method comprising:

(a) when the first buffering space receives a data corresponding to a defect of the optical disc, not suspending the first buffering space from receiving the user data, and transferring the data, corresponding to the defect and stored in the first buffering space, to the second buffering space; and (b) when the amount of data stored in the second buffering space reaches a predetermined value, suspending the optical disc drive from writing data stored in the first buffering space into the user data area, and driving the optical disc drive to write data stored in the second buffering space into the spare area.

2. The method of claim 1, wherein step (a) further comprises:

not suspending from reading the data stored in the first buffering space for writing the data stored in the first buffering space into the optical disc.

3. The method of claim 1, wherein the first and second buffering spaces are set in at least a dynamic random access memory (DRAM).

4. The method of claim 1, wherein the optical disc is a digital versatile disc (DVD) or a compact disc (CD), and the digital versatile disc is a High-definition DVD (HD-DVD) or a Blu-ray disc (BD).

5. The method of claim 1, wherein step (a) further comprises:

(a1) protecting the data corresponding to the defect from being overwritten by following new user data before the data corresponding to the defect is completely transferred to the second buffering space.

6. The method of claim 5, wherein step (a1) further comprises:

setting a mask flag to the data corresponding to the defect in the first buffering space, for avoiding the data corresponding to the defect from being overwritten by the following new user data before the data corresponding to the defect is completely transferred to the second buffering space.

7. The method of claim 6, wherein step (a1) further comprises:

when the data corresponding to the defect is completely transferred to the second buffering space, if the first buffering space has another data corresponding to a next defect which is not yet transferred to the second buffering space, setting the mask flag to the data corresponding to the next defect; otherwise, clearing the mask flag.

8. A data managing method for an optical disc drive writing user data into an optical disc having defects, the optical disc drive comprises a first buffering space and a second buffering space, the first buffering space for storing data predetermined to be recorded into a user data area on the optical disc, the second buffering space for storing data predetermined to be recorded into a spare area on the optical disc, the data managing method comprising:

when the first buffering space receives a data corresponding to a defect of the optical disc, not suspending from reading the data stored in the first buffering space and writing the data stored in the first buffering space into the optical disc, and transferring the data, corresponding to the defect and stored in the first buffering space, to the second buffering space; and when the amount of data stored in the second buffering space reaches a predetermined value, suspending the optical disc drive from writing data stored in the first buffering space into the user data area, and driving the optical disc drive to write data stored in the second buffering space into the spare area.

* * * * *